United States Patent
Xie et al.

(10) Patent No.: US 12,366,728 B2
(45) Date of Patent: Jul. 22, 2025

(54) OPTICAL SYSTEM, IMAGE ACQUISITION MODULE AND ELECTRONIC DEVICE

(71) Applicant: JIANGXI JINGCHAO OPTICAL CO., LTD., Nanchang (CN)

(72) Inventors: Han Xie, Nanchang (CN); Ming Li, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 887 days.

(21) Appl. No.: 17/536,010

(22) Filed: Nov. 27, 2021

(65) Prior Publication Data

US 2023/0084833 A1 Mar. 16, 2023

(30) Foreign Application Priority Data

Sep. 15, 2021 (CN) .......................... 202111082119.4

(51) Int. Cl.
*G02B 13/00* (2006.01)
*G02B 13/06* (2006.01)
*G02B 13/18* (2006.01)

(52) U.S. Cl.
CPC ..... *G02B 13/0045* (2013.01); *G02B 13/0055* (2013.01); *G02B 13/06* (2013.01); *G02B 13/18* (2013.01)

(58) Field of Classification Search
CPC .......................... G02B 13/0045; G02B 13/0055; G02B 13/06; G02B 13/18; G02B 9/60; G02B 13/0015; G02B 13/006; G03B 30/00

See application file for complete search history.

(56) References Cited

U.S. PATENT DOCUMENTS

| 4,981,344 A | 1/1991 | Ueda |
| 6,414,800 B1 | 7/2002 | Hamano |

(Continued)

FOREIGN PATENT DOCUMENTS

| CN | 1206842 A | 2/1999 |
| CN | 1297164 A | 5/2001 |

(Continued)

OTHER PUBLICATIONS

Mansurov ("What is field curvature?". Dec. 12, 2019, retrieved Oct. 28, 2024, from https://photographylife.com/what-is-field-curvature) (Year: 2019).*

(Continued)

*Primary Examiner* — Joseph P Martinez
*Assistant Examiner* — Ray Alexander Dean
(74) *Attorney, Agent, or Firm* — Franklin & Associates International Inc; Matthew F. Lambrinos

(57) ABSTRACT

The optical system includes, successively in order from an object side to an image side: a first lens having a negative refractive power, an image side surface of the first lens being concave near an optical axis; a second lens having a positive refractive power, an object side surface thereof being convex near the optical axis, an image side surface of the second lens being concave near the optical axis; a third lens having a positive refractive power, an object side surface thereof being convex near the optical axis, an image side surface of the third lens being convex near the optical axis; a fourth lens having a negative refractive power; a fifth lens having a positive refractive power, an object side surface thereof being convex near the optical axis, an image side surface thereof being concave near the optical axis. The optical system satisfies the following condition: $0.58 \leq R12/f \leq 0.71$.

13 Claims, 7 Drawing Sheets

(56) References Cited

U.S. PATENT DOCUMENTS

| | | | |
|---|---|---|---|
| 6,985,309 B2 | 1/2006 | Shinohara | |
| 9,057,868 B1 | 6/2015 | Chung et al. | |
| 2004/0218285 A1 | 11/2004 | Amanai | |
| 2004/0264003 A1 | 12/2004 | Noda | |
| 2005/0046970 A1 | 3/2005 | Amanai | |
| 2008/0106801 A1 | 5/2008 | Kang et al. | |
| 2010/0254029 A1 | 10/2010 | Shinohara | |
| 2012/0075718 A1 | 3/2012 | Seo | |
| 2012/0307382 A1* | 12/2012 | Hsu | G02B 13/0045 359/770 |
| 2014/0063620 A1 | 3/2014 | Jung et al. | |
| 2015/0138425 A1 | 5/2015 | Lee et al. | |
| 2016/0124192 A1 | 5/2016 | Koreeda | |
| 2016/0161709 A1 | 6/2016 | Hsueh et al. | |
| 2017/0307858 A1 | 10/2017 | Chen | |
| 2018/0113282 A1 | 4/2018 | Tsai | |
| 2020/0073092 A1 | 3/2020 | Chen | |

FOREIGN PATENT DOCUMENTS

| | | |
|---|---|---|
| CN | 101093274 A | 12/2007 |
| CN | 101983348 A | 3/2011 |
| CN | 102132189 A | 7/2011 |
| CN | 102419470 A | 4/2012 |
| CN | 102466864 A | 5/2012 |
| CN | 202522758 U | 11/2012 |
| CN | 102914851 A | 2/2013 |
| CN | 102985865 A | 3/2013 |
| CN | 102998774 A | 3/2013 |
| CN | 103676088 A | 3/2014 |
| CN | 103852858 A | 6/2014 |
| CN | 103969804 A | 8/2014 |
| CN | 104570277 A | 4/2015 |
| CN | 104570295 A | 4/2015 |
| CN | 104914558 A | 9/2015 |
| CN | 104932086 A | 9/2015 |
| CN | 204631345 U | 9/2015 |
| CN | 105259636 A | 1/2016 |
| CN | 105372793 A | 3/2016 |
| CN | 105607232 A | 5/2016 |
| CN | 105607233 A | 5/2016 |
| CN | 205210492 U | 5/2016 |
| CN | 205210493 U | 5/2016 |
| CN | 105988185 A | 10/2016 |
| CN | 105988186 A | 10/2016 |
| CN | 106033141 A | 10/2016 |
| CN | 106154496 A | 11/2016 |
| CN | 106338815 A | 1/2017 |
| CN | 106526796 A | 3/2017 |
| CN | 206074890 U | 4/2017 |
| CN | 106610518 A | 5/2017 |
| CN | 106646825 A | 5/2017 |
| CN | 106772931 A | 5/2017 |
| CN | 106773008 A | 5/2017 |
| CN | 106802469 A | 6/2017 |
| CN | 106842512 A | 6/2017 |
| CN | 106842514 A | 6/2017 |
| CN | 106896474 A | 6/2017 |
| CN | 106959500 A | 7/2017 |
| CN | 106970464 A | 7/2017 |
| CN | 107024756 A | 8/2017 |
| CN | 107102425 A | 8/2017 |
| CN | 107167897 A | 9/2017 |
| CN | 107167902 A | 9/2017 |
| CN | 206460205 U | 9/2017 |
| CN | 107290843 A | 10/2017 |
| CN | 206946078 U | 1/2018 |
| CN | 107703609 A | 2/2018 |
| CN | 107831588 A | 3/2018 |
| CN | 207164341 U | 3/2018 |
| CN | 107976770 A | 5/2018 |
| CN | 108089278 A | 5/2018 |
| CN | 108089317 A | 5/2018 |
| CN | 207424362 U | 5/2018 |
| CN | 207424363 U | 5/2018 |
| CN | 108107548 A | 6/2018 |
| CN | 108227146 A | 6/2018 |
| CN | 207557562 U | 6/2018 |
| CN | 108459394 A | 8/2018 |
| CN | 108761745 A | 11/2018 |
| CN | 108873250 A | 11/2018 |
| CN | 109283665 A | 1/2019 |
| CN | 109375346 A | 2/2019 |
| CN | 208506348 U | 2/2019 |
| CN | 109407267 A | 3/2019 |
| CN | 109725406 A | 5/2019 |
| CN | 109752823 A | 5/2019 |
| CN | 109814234 A | 5/2019 |
| CN | 109814235 A | 5/2019 |
| CN | 208833988 U | 5/2019 |
| CN | 208872939 U | 5/2019 |
| CN | 208888449 U | 5/2019 |
| CN | 109870786 A | 6/2019 |
| CN | 109870788 A | 6/2019 |
| CN | 109917533 A | 6/2019 |
| CN | 110018556 A | 7/2019 |
| CN | 209070186 U | 7/2019 |
| CN | 110109226 A | 8/2019 |
| CN | 110208927 A | 9/2019 |
| CN | 110261997 A | 9/2019 |
| CN | 110398815 A | 11/2019 |
| CN | 110426822 A | 11/2019 |
| CN | 110531500 A | 12/2019 |
| CN | 110568583 A | 12/2019 |
| CN | 110618522 A | 12/2019 |
| CN | 209765129 U | 12/2019 |
| CN | 110646919 A | 1/2020 |
| CN | 110646921 A | 1/2020 |
| CN | 110794555 A | 2/2020 |
| CN | 110879454 A | 3/2020 |
| CN | 111007649 A | 4/2020 |
| CN | 111025600 A | 4/2020 |
| CN | 111308688 A | 6/2020 |
| CN | 111338057 A | 6/2020 |
| CN | 210720853 U | 6/2020 |
| CN | 111399186 A | 7/2020 |
| CN | 211786331 U | 10/2020 |
| JP | 2008268977 A | 11/2008 |
| JP | 2013235242 A | 11/2013 |
| KR | 1020140135909 A | 11/2014 |
| TW | 201350956 A | 12/2013 |
| TW | I625567 B | 6/2018 |
| TW | I640811 B | 11/2018 |
| TW | I655474 B | 4/2019 |
| WO | 2003046633 A2 | 6/2003 |
| WO | WO-2014050476 A1 * | 4/2014 ......... G02B 13/0045 |
| WO | 2014162779 A1 | 10/2014 |
| WO | 2015159721 A1 | 10/2015 |
| WO | 2017180362 A1 | 10/2017 |
| WO | 2020073978 A1 | 4/2020 |
| WO | 2020220444 A1 | 11/2020 |
| WO | 2020258269 A1 | 12/2020 |
| WO | 2021026869 A1 | 2/2021 |
| WO | 2021072745 A1 | 4/2021 |
| WO | 2021087661 A1 | 5/2021 |
| WO | 2021087669 A1 | 5/2021 |
| WO | 2021102943 A1 | 6/2021 |
| WO | 2021103797 A1 | 6/2021 |
| WO | 2021109127 A1 | 6/2021 |
| WO | 2021138754 A1 | 7/2021 |
| WO | 2021179207 A1 | 9/2021 |
| WO | 2021184164 A1 | 9/2021 |
| WO | 2021184165 A1 | 9/2021 |
| WO | 2021184167 A1 | 9/2021 |
| WO | 2021203277 A1 | 10/2021 |
| WO | 2021217504 A1 | 11/2021 |
| WO | 2021217664 A1 | 11/2021 |

OTHER PUBLICATIONS

International Search Report dated on Jan. 15, 2020 on International Patent Application PCT/CN2019/110525, filed Jan. 3, 2020, in the

(56) References Cited

OTHER PUBLICATIONS name of Jiangxi Jingchao Optical Co. Ltd.
U.S. Appl. No. 17/284,467, 371 filed Apr. 11, 2021, in the name of Jiangxi Jingchao Optical Co. Ltd.
International Search Report on International Patent Application PCT/CN2019/100747, filed Aug. 8, 2019, in the name of Jiangxi Jingchao Optical Co. Ltd.
U.S. Appl. No. 17/601,075, 371 filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, 371 filed Sep. 19, 2021, in the name of Jiangxi Jingchao Optical Co. Ltd.
U.S. Appl. No. 17/605,985, 371 filed Oct. 22, 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, 371 filed Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, 371 filed Oct. 18, 2021, in the name of Jiangxi Jingchao Optical Co. Ltd.
International Search Report on International Patent Application PCT/CN2019/122072, filed Nov. 29, 2019, in the name of Jiangxi Jingchao Optical Co. Ltd.
U.S. Appl. No. 17/606,027, 371 filed Oct. 23, 2021, in the name of Jiangxi Jingchao Optical Co. Ltd,.
International Search Report on International Patent Application PCT/CN2019/111957, filed Oct. 18, 2019, in the name of Jiangxi Jingchao Optical Co. Ltd.
U.S. Appl. No. 17/606,040, 371 filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, 371 filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, 371 filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, 371 filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, 371 filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, 371 filed Nov. 13, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, 371 filed Nov. 14, 2021, in the name of Jiangxi Jingchao Optical Co. Ltd,.
International Search Report on International Patent Application PCT/CN2020/103797, filed Jul. 23, 2020, in the name of Ofilm Group Co. Ltd.
U.S. Appl. No. 17/612,556, 371 filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, 371 filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, 371 filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, 371 filed Nov. 26, 2021, in the name of OFilm Group Co. Ltd. and Jiangxi Jingchao Optical Co. Ltd.
U.S. Appl. No. 17/536,006, filed Nov. 27, 2021, in the name of Jiangxi Jingchao Optical Co. Ltd.

* cited by examiner

OPTICAL SYSTEM, IMAGE ACQUISITION MODULE AND ELECTRONIC DEVICE

CROSS-REFERENCE TO RELATED APPLICATIONS

This application claims to the priority of Chinese Patent Application No. 2021110821194, filed on Sep. 15, 2021, the entire contents of which is incorporated herein by reference.

TECHNICAL FIELD

The present disclosure relates to the camera field, in particular to an optical system, an image acquisition module, and an electronic device.

BACKGROUND

In recent years, with the rapid improvement of living standards and the rapid development of electronic devices such as smart phones, tablet computers, and e-readers, consumers have increasingly demanded the camera function of camera lenses. On the market, wide-angle lenses, macro lenses, infrared lenses, etc. emerge in various ways, to meet the requirements of different people, and thus the difficulty of developing camera lenses has risen sharply. The demand for the wide-angle lens is increasing year by year, since the wide-angle lens can capture images in a wider range within a limited distance, and can capture more complete scenery of the surrounding area when travelling outdoors. In order to meet the requirements of capturing in large range and improve consumer experience, the industry urgently needs to develop a camera lens with wide-angle characteristics.

SUMMARY

According to various embodiments, an optical system, an image acquisition module and an electronic device are provided.

An optical system includes, successively in order from an object side to an image side along an optical axis:
 a first lens having a negative refractive power, an image side surface of the first lens being concave near the optical axis;
 a second lens having a positive refractive power, an object side surface of the second lens being convex near the optical axis, an image side surface of the second lens being concave near the optical axis;
 a third lens having a positive refractive power, an object side surface of the third lens being convex near the optical axis, an image side surface of the third lens being convex near the optical axis;
 a fourth lens having a negative refractive power;
 a fifth lens having a positive refractive power, an object side surface of the fifth lens being convex near the optical axis, an image side surface of the fifth lens being concave near the optical axis;
 wherein the optical system satisfies the following condition:
 $0.58 \leq R12/f \leq 0.71$;
 wherein R12 is a radius of curvature of the image side surface of the first lens at the optical axis, and f is an effective focal length of the optical system.

An image acquisition module includes a photosensitive element and the optical system as described above. The photosensitive element is arranged on the image side of the optical system.

An electronic device includes a housing and the image acquisition module as described above. The image acquisition module is located in the housing.

Details of one or more embodiments of the present disclosure will be given in the following description and attached drawings. Other features, objects and advantages of the present disclosure will become apparent from the description, drawings, and claims.

DETAILED DESCRIPTION OF THE EMBODIMENTS

In order to enable the above objects, features and advantages of the present disclosure more obvious and understandable, the specific embodiments of the present disclosure will be described in detail below with reference to the accompanying drawings. In the following description, many specific details are illustrated in order to aid in understanding of the present disclosure. However, the present disclosure can be implemented in many other ways different from those described herein, and those skilled in the art can make similar improvements without departing from the connotation of the present disclosure. Therefore, the present disclosure is not limited by the specific embodiments disclosed below.

In addition, the terms "first" and "second" are used for description only, and cannot be understood as indicating or implying relative importance or implicitly indicating the number of technical features indicated. Thus, the features defined with "first" and "second" may include at least one of the features explicitly or implicitly. In the description of the present disclosure, the meaning of "plurality" is at least two, for example, two, three or the like, unless explicitly and specifically defined otherwise.

In the present disclosure, unless expressly specified and defined otherwise, a first feature being "on" or "below" a second feature may mean that the first feature is in direct contact with the second feature, or may mean that the first feature is in indirect contact with the second feature through an intermediate medium. Moreover, the first feature being "above", "top" and "upside" on the second feature may mean that the first feature is directly above or obliquely above the second feature, or simply mean that the level of the first feature is higher than that of the second feature. The first feature being "below", "under" and "beneath" the second feature may mean that the first feature is directly below or obliquely below the second feature, or simply mean that the level of the first feature is smaller than that of the second feature.

Figure 1:
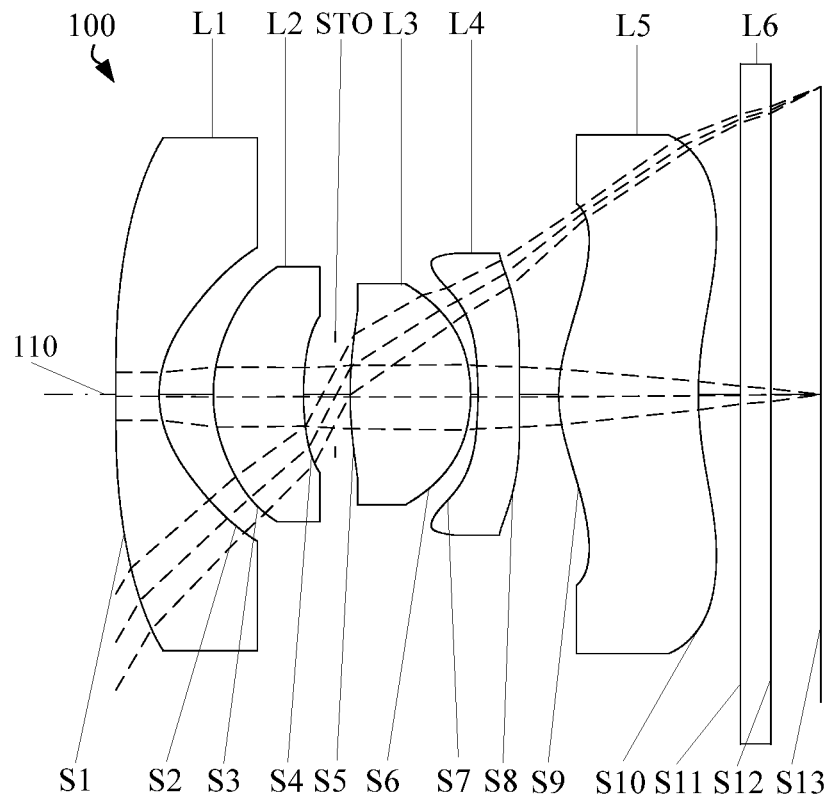
FIG. 1 is a schematic view of an optical system according to a first embodiment of the present disclosure.

Referring to FIG. 1, according to some embodiments of the present disclosure, an optical system 100 includes, successively in order from an object side to an image side, a first lens L1, a second lens L2, a third lens L3, a fourth lens L4, and a fifth lens L5. Specifically, the first lens L1 includes an object side surface S1 and an image side surface S2. The second lens L2 includes an object side surface S3 and an image side surface S4. The third lens L3 includes an object side surface S5 and an image side surface S6. The fourth lens L4 includes an object side surface S7 and an image side surface S8. The fifth lens L5 includes an object side surface S9 and an image side surface S10. The first lens L1, the second lens L2, the third lens L3, the fourth lens L4, and the fifth lens L5 are coaxially arranged. A common axis of the lenses in the optical system 100 is an optical axis 110 of the optical system 100.

The first lens L1 has a negative refractive power, and the image side surface S2 of the first lens L1 is concave at the near optical axis 110, which is beneficial to the incidence of large-angle light into the optical system 100, thereby facilitating the realization of wide-angle characteristics. The second lens L2 has a positive refractive power. The object side surface S3 of the second lens L2 is convex near the optical axis 110, and the image side surface S4 thereof is concave near the optical axis 110, which is beneficial to correct aberration such as spherical aberration generated by the first lens L1, while enabling the smooth transition of the light, thereby helping to improve the imaging quality of the optical system 100. The third lens L3 has a positive refractive power. The object side surface S5 and the image side surface S6 of the third lens L3 are convex near the optical axis 110, which can effectively converge the light to reduce the angle of the incident light, such that the smooth transition of the light can be realized. Moreover, it is beneficial to shorten the total length of the optical system 100. The fourth lens L4 has a negative refractive power, which can match with the positive refractive power of the third lens L3. As such, it is beneficial for the light emitted by the second lens L2 to be smoothly transitioned to the fifth lens L5. The fifth lens L5 has a positive refractive power. The object side surface S9 of the fifth lens L5 is convex near the optical axis 110, and the image side surface S10 thereof is concave near the optical axis 110, which is beneficial to correct the curvature of field, astigmatism and the high-order aberration of the large-angle field of view of the optical system 100, thereby improving the imaging quality of the optical system 100. With the above-mentioned refractive power and surface shape features, when the optical system 100 has wide-angle characteristics, the distortion and aberration will not be too large, which is beneficial to improve the realism of the image restitution, thereby improving the user's experience.

In addition, in some embodiments, the optical system 100 further includes a stop STO. The stop STO may be provided between the second lens L2 and the third lens L3. In some embodiments, the optical system 100 further includes an infrared filter L6 provided on an image side of the fifth lens L5. The infrared filter L6 may be an infrared cut-off filter, which is used to filter out interference light, so as to prevent the interference light from reaching the imaging surface of the optical system 100 and affecting normal imaging. Further, the optical system 100 further includes an image surface S13 on the image side of the fifth lens L5. The image surface S13 is the imaging surface of the optical system 100. The incident light adjusted by the first lens L1, the second lens L2, the third lens L3, the fourth lens L4, and the fifth lens L5 can be imaged on the image surface S13.

In some embodiments, the object side surface and the image side surface of each lens of the optical system 100 are both aspherical. The use of an aspheric structure can improve the flexibility of lens design, effectively correct spherical aberration, and improve imaging quality. In other embodiments, the object side surface and the image side surface of each lens of the optical system 100 may also be spherical. It should be noted that the above-mentioned embodiments are only examples of some embodiments of the present disclosure. In some embodiments, the surfaces of the lenses in the optical system 100 may be any combination of the spherical surface and the aspheric surface.

In some embodiments, the lenses in the optical system 100 may be made of glass or plastic. The lens made of plastic can reduce the weight of the optical system 100 and reduce the production cost, which can realize the thin and light design of the optical system 100 with the small size of the optical system 100. The lens made of glass enables the optical system 100 to have excellent optical performance and higher temperature resistance. It should be noted that the lenses in the optical system 100 can also made of any combination of glass and plastic, and not necessarily all of them are made of glass or plastic.

It should be noted that the first lens L1 does not necessary include only one lens. In some embodiments, there may also be two or more lenses in the first lens L1, and the two or more lenses can form a cemented lens. A surface of the cemented lens closest to the object side can be regarded as the object side surface S1, and a surface thereof closest to the image side can be regarded as the image side surface S2. Alternatively, the lenses in the first lens L1 does not form the cemented lens, but the distance between the lenses is relatively fixed. In this case, the object side surface of the lenses closest to the object side is the object side surface S1, and the image side surface of the lenses closest to the image side is the image side surface S2. In addition, in some embodiments, two or more lenses may also be arranged in the second lens L2, the third lens L3, the fourth lens L4, or the fifth lens L5. Any adjacent lenses may form the cemented lens, or a non-cemented lens.

Further, in some embodiments, the optical system 100 satisfies a condition: $0.58 \leq R12/f \leq 0.71$, where R12 is a radius of curvature of the image side surface S2 of the first lens L1 at the optical axis 110, and f is an effective focal length of the optical system 100. Specifically, the value of R12/f may be 0.581, 0.585, 0.590, 0.592, 0.598, 0.634, 0.648, 0.673, 0.688 or 0.701. When the above condition is satisfied, the ratio of the radius of curvature of the image side surface S2 of the first lens L1 at the optical axis 110 to the effective focal length of the optical system 100 can be reasonably configured, cooperating with the image side surface S2 of the first lens L1 having the concave shape, it is beneficial to enlarge the angle of field of view of the optical system 100, enable the optical system 100 to have wide-angle characteristics, and while it is also beneficial to prevent the image side surface S2 of the first lens L1 from being excessively curved in shape, thereby helping to reduce the designing and forming difficulty of the first lens L1. If the upper limit of the above condition is exceeded, the radius of curvature of the image side surface S2 of the first lens L1 at the optical axis 110 will be too large, the image side surface S2 of the first lens L1 will be too smooth in shape, which results in that the large-angle light is not easily deflected by the first lens L1 into the second lens L2 and the third lens L3, which is disadvantageous to the realization of wide-angle characteristics. If the lower limit of the above condition is not reached, the radius of curvature of the image side surface S2 of the first lens L1 at the optical axis 110 will be too small, the image side surface S2 of the first lens L1 will be excessively curved in shape, and the edge inclination angle of the image side surface S2 of the first lens L1 is also increased therewith. As such, it will easily lead to an increase in tolerance sensitivity of the first lens L1 and poor manufacturability, which is disadvantageous to the design and manufacture of the first lens L1.

In some embodiments, the optical system 100 satisfies a condition: $-0.7 \leq f12/f45 < 0$; where f12 is a combined focal length of the first lens L1 and the second lens L2, and f45 is a combined focal length of the fourth lens L4 and the fifth lens L5. Specifically, the value of f12/f45 may be: $-0.631$, $-0.625$, $-0.613$, $-0.587$, $-0.573$, $-0.555$, $-0.527$, $-0.519$, $-0.453$, or $-0.404$. When the above condition is satisfied, the ratio of the combined focal length of the first lens L1 and the second lens L2 to the combined focal length of the fourth lens L4 and the fifth lens L5 can be reasonably configured, which facilitates the large-angle light incident to the first lens L1 and the second lens L2. As such, it is beneficial to realize the wide-angle characteristics of the optical system 100, and while it is also beneficial for the fourth lens L4 and the fifth lens L5 to correct the aberration of the optical system 100, and beneficial to shorten the total length of the optical system 100. In addition, it is also beneficial to for two lens group at the object side and the image side of the third lens L3 to match with two convex surfaces of the third lens L3, which is beneficial to suppress the distortion of the optical system 100, improving the image restitution degree of the optical system 100. If the lower limit of the above condition is not reached, the refractive power provided by the first lens L1 and the second lens L2 is too small, which is out of balance with the refractive power of the fourth lens L4 and the fifth lens L5, which is disadvantageous for the two lens group at the object side and the image side of the third lens L3 to match with the third lens L3, and thus is disadvantageous to improve the imaging quality of the optical system 100.

In some embodiments, the optical system 100 satisfies a condition: $1.6 \leq f2/f3 \leq 2.1$; where f2 is an effective focal length of the second lens L2, and f3 is an effective focal length of the third lens L3. Specifically, the value of f2/f3 may be: 1.682, 1.712, 1.735, 1.786, 1.822, 1.847, 1.889, 1.924, 1.955, or 2.019. When the above condition is satisfied, a ratio of the effective focal length the second lens L2 to the effective focal length of the third lens L3 can be reasonably configured, which is beneficial for the second lens L2 to match with the first lens L1, thereby helping to correct the severe spherical aberrations generated by the first lens L1. In addition, it is also beneficial for the third lens L3 to provide sufficient positive refractive power for the optical system 100, thereby shortening the total length of the optical system 100, and while the third lens L3 has sufficient central thickness to suppress the increase in sensitivity cause by the light deflection angle becoming larger. As such, it is beneficial to correct the aberration of the optical system 100 and suppress large-angle optical distortion, thereby helping to solve the problems that the severely distortion generated when the optical system 100 realizes the wide-angle characteristics causes the edge of the captured picture to be distorted.

In some embodiments, the optical system 100 satisfies a condition: $0.3 \leq \Sigma T/\Sigma CT \leq 0.55$; where $\Sigma T$ is a sum of the intervals between two adjacent lenses among the first lens L1, the second lens L2, the third lens L3, the fourth lens L4, and the fifth lens L5 on the optical axis 110, $\Sigma CT$ is a sum of the thicknesses of the first lens L1, the second lens L2, the third lens L3, the fourth lens L4, and the fifth lens L5 on the optical axis 110. Specifically, the value of $\Sigma T/\Sigma CT$ may be: 0.338, 0.357, 0.386, 0.412, 0.435, 0.478, 0.493, 0.511, 0.515 or 0.520. When the above condition is satisfied, the center thicknesses of and the intervals between the five lenses in the optical system 100 can be reasonably configured, which is beneficial to a more compact structure of the optical system 100, and thus it is beneficial to shorten the total optical length, and while it also prevents the center thicknesses of and the intervals between the five lenses from being not too extreme, which helps to improve the manufacturability of the optical system 100. If the upper limit of the above condition is exceeded, the intervals between the five lenses is too large, which is disadvantageous to shorten the total length of the optical system 100. If the lower limit of the above condition is not reached, the intervals between the five lenses are too small, resulting in that the space used to deflect the light is limited, and the light deflection angle increases, which is disadvantageous to correct the aberrations of the optical system 100, nor beneficial to the assembly of the optical system 100.

In some embodiments, the optical system 100 satisfies a condition: $1.8 \leq \Sigma T1/CT1 \leq 2.9$; where $\Sigma T1$ is a distance from a portion of the object side surface S1 having the maximum effective aperture to a portion of the image side surface S2 having the maximum effective aperture of the first lens L1 in a direction of the optical axis 110, CT1 is a thickness of the first lens L1 on the optical axis 110. Specifically, the value of $\Sigma T1/CT1$ may be: 1.940, 1.974, 2.026, 2.134, 2.257, 2.364, 2.455, 2.637, 2.722, or 2.887. When the above condition is satisfied, a ratio of the edge thickness to the center thickness of the first lens L1 can be reasonably configured, such that the first lens L1 will not be excessively curved in shape, which is beneficial to the design and forming of the first lens L1, thereby improving the manufacturability of the first lens L1, and while it is also beneficial to reduce the thickness of the first lens L1 as much as possible, thereby reducing the size of the front portion of the optical system 100. If the lower limit of the above condition is not reached, the edge thickness of the first lens L1 is too small, causing the first lens L1 to be excessively curved in shape, which is disadvantageous to the forming of the first lens L1, and reduces the manufacturability of the first lens L1. If the upper limit of the above condition is exceeded, the edge thickness of the first lens L1 is too large, causing the size of the front portion of the optical system 100 to be too large, which is disadvantageous to the assembly of the optical system 100.

In some embodiments, the optical system 100 satisfies a condition: $0.9 \leq Y11/Y52 \leq 1.1$; where Y11 is the maximum effective aperture of the object side surface S1 of the first lens L1, and Y52 is the maximum effective aperture of the image side surface S10 of the fifth lens L5. Specifically, the value of Y11/Y52 may be 0.957, 0.963, 0.975, 0.986, 0.994, 1.021, 1.034, 1.055, 1.064, or 1.075. When the above condition is satisfied, a ratio of the maximum effective aperture of the object side surface S1 of the first lens L1 to the maximum effective aperture of the image side surface S10 of the fifth lens L5 can be reasonably configured, such that an aperture of the front portion is similar to an aperture of the rear portion of the optical system 100. The structure of optical system 100 can have a better symmetry, which is more beneficial to correct the aberration of the optical system 100, suppressing the distortion of the optical system 100, and thereby improving the imaging quality of the optical system 100.

In some embodiments, the optical system 100 satisfies a condition: $0.6 \leq BFL/f \leq 0.8$; where BFL is a distance from the image side surface S10 of the fifth lens L5 to the imaging surface of the optical system 100 on the optical axis 110. Specifically, the value of BFL/f may be 0.645, 0.653, 0.668, 0.672, 0.685, 0.699, 0.705, 0.718, 0.726 or 0.731. When the above condition is satisfied, a ratio of the optical back focus to the effective focal length of the optical system 100 can be reasonably configured, such that the optical system 100 has enough back focus space to move back and forth to focus, and it also easier for the optical system 100 to match with a photosensitive element, and thus which is beneficial to improve the imaging quality of the optical system 100. In addition, the optical back focus of the optical system 100 is not too long, such that is beneficial to shorten the total length of the optical system 100. If the lower limit of the above condition is not reached, the optical back focus of the optical system 100 is too small, resulting in the chief ray angle (CRA) of the optical system 100 being limited, which is disadvantageous for the optical system 100 to match with the photosensitive element. If the upper limit of the above condition is exceeded, the optical back focus of the optical system 100 is too long, which is disadvantageous to shorten the total length of the optical system 100, and which is thus disadvantageous to the application of the optical system 100 in portable electronic devices.

In some embodiments, the optical system 100 satisfies a condition: $55 \text{ deg/mm} \leq FOV/ImgH \leq 57 \text{ deg/mm}$; where FOV is the maximum angle of field of view of the optical system 100, and ImgH is half of the image height of the optical system 100 corresponding to the maximum angle of field of view. Specifically, the value of FOV/ImgH may be: 55.556, 55.633, 55.715, 55.812, 55.936, 56.217, 56.359, 56.402, 56.474 or 56.542, in unit of deg/mm. When the above condition is satisfied, a ratio of the maximum angle of field of view to the half-image height of the optical system 100 can be reasonably configured, which is beneficial to expand the angle of field of view of the optical system 100, achieving wide-angle characteristics, and enabling the optical system 100 to capture pictures in a wider range. Moreover, it is also beneficial to increase the size of the imaging surface of the optical system 100, such that the optical system 100 can match with a larger-sized photosensitive element, thereby helping to increase the pixels of the optical system 100. In addition, the angle of field of view of the optical system 100 is not too large, which is beneficial to the correction of the distortion and aberration of the optical system 100. If the upper limit of the above condition is exceeded, the angle of field of view of the optical system 100 is too large, resulting in difficulty in the correction of distortion and aberrations of the optical system 100, thereby resulting in unclear imaging and severe image distortion of the optical system 100. If the lower limit of the above condition is not reached, the angle of field of view of the optical system 100 is too small, which is difficult to meet the requirements of capturing in large range.

It should be noted that, in some embodiments, the optical system 100 may match with the photosensitive element having a rectangular photosensitive surface, and the imaging surface of the optical system 100 coincides with the photosensitive surface of the photosensitive element. In this case, the effective pixel area on the imaging surface of the optical system 100 has a horizontal direction and a diagonal direction, the FOV can be understood as the maximum angle of field of view of the optical system 100 in the diagonal direction, and ImgH can be understood as half of the length of the effective pixel area on the imaging surface of the optical system 100 in the diagonal direction.

In some embodiments, the optical system 100 satisfies a condition: $|DIST| \leq 5\%$; where DIST is the maximum of the optical distortion of the optical system 100. Specifically, the value of DIST may be: 3.000, 3.670, 4.600, 4.830, or 5.000, in unit of %. When the above condition is satisfied, the distortion of the optical system 100 can be suppressed while realizing the wide-angle characteristics, thereby improving the realism of the picture restitution and enhancing the consumer's experience.

In some embodiments, the optical system 100 satisfies a condition: $n2+n4 \geq 3.32$; where n2 is the refractive index of the second lens L2 at a wavelength of 587.5618 nm, and n4 is the refractive index of the fourth lens L4 at the wavelength of 587.5618 nm. Specifically, the value of n2+n4 may be: 3.320, 3.322, 3.324, 3.327, 3.328, 3.301, 3.325, 3.326, 3.329 or 3.332. When the above condition is satisfied, the refractive indices of the second lens L2 and the fourth lens L4 can be reasonably configured, thereby improving the modulation transfer function of the optical system 100, facilitating correcting the chromatic aberration of the optical system 100, and improving the resolution of the optical system 100. If the lower limit of the above condition is not reached, the refractive index of the second lens L2 and the fourth lens L4 is insufficient, which is disadvantageous to converge the light, resulting in insufficient aberration correction of the optical system 100.

A reference wavelength of the above effective focal length and combined focal length is 587.5618 nm.

Based on the description of the foregoing embodiments, more specific embodiments and drawings are illustrated below for detailed description.

First Embodiment

Figure 2:
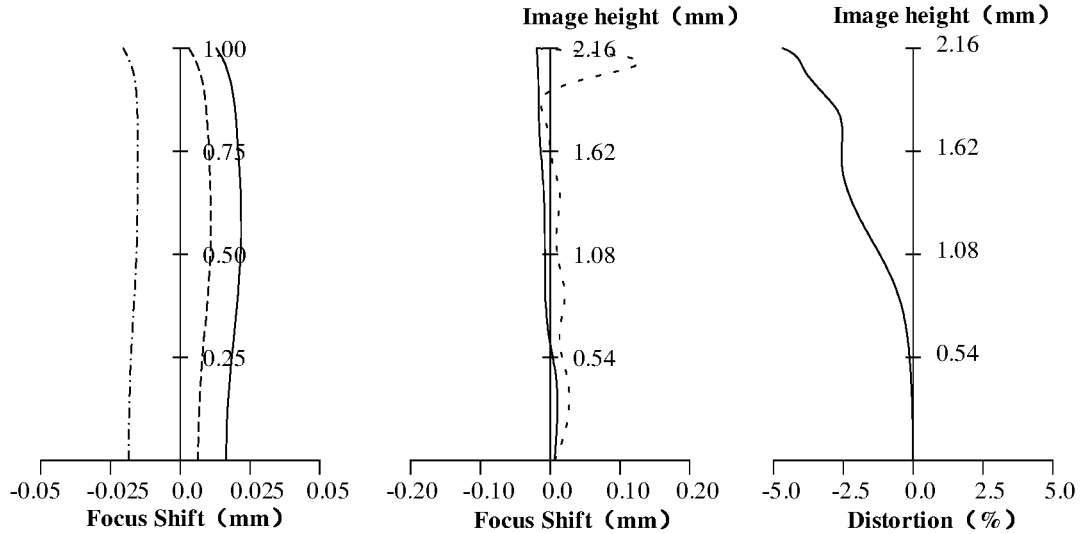
FIG. 2 is a graph showing longitudinal spherical aberration, astigmatism, and distortion of the optical system of FIG. 1.

FIG. 1 is a schematic view of an optical system 100 according to a first embodiment. The optical system 100 includes, successively in order from an object side to an image side, a first lens L1 having a negative refractive power, a second lens L2 having a positive refractive power, a stop STO, a third lens L3 having a positive refractive power, a fourth lens L4 having a negative refractive power, and a fifth lens L5 having a positive refractive power. FIG. 2 is a graph showing longitudinal spherical aberration, astigmatism, and distortion of the optical system 100 according to the first embodiment in order from left to right, where the reference wavelength of the astigmatism diagram and the distortion diagram is 587.5618 nm, and which are the same as other embodiments.

An object side surface S1 of the first lens L1 is convex near an optical axis 110 and convex at a circumference thereof.

An image side surface S2 of the first lens L1 is concave near the optical axis 110 and concave at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and convex at a circumference thereof.

An image side surface S6 of the third lens L3 is convex near the optical axis 110 and convex at a circumference thereof.

An object side surface S7 of the fourth lens L4 is concave near the optical axis 110 and concave at a circumference thereof.

An image side surface S8 of the fourth lens L4 is concave near the optical axis 110 and convex at the circumference thereof.

An object side surface S9 of the fifth lens L5 is convex near the optical axis 110 and concave at a circumference thereof.

An image side surface S10 of the fifth lens L5 is concave near the optical axis 110 and convex at the circumference thereof.

The object side surfaces and the image side surfaces of the first lens L1, the second lens L2, the third lens L3, the fourth lens L4, and the fifth lens L5 are all aspherical.

It should be noted that in this disclosure, when describing that a surface of the lens at the optical axis 110 (a central area of the surface) is convex, it can be understood that an area of this surface of the lens near the optical axis 110 is convex. When describing a surface of the lens is concave at a circumference thereof, it can be understood that an area of this surface approaching the maximum effective radius is concave. For example, when this surface is convex near the optical axis 110 and is also convex at a circumference thereof, a shape of this surface in a direction from its center (an intersection between this surface and the optical axis 110) to its edge may be completely convex, or may be firstly convex at its center and be then transitioned to be concave, and then become convex when approaching the maximum effective radius. These are only examples to illustrate the relationships between various shapes and structures (concave-convex relationships) of the surface at the optical axis 110 and at the circumference, and the various shapes and structures (concave-convex relationships) of the surface are not fully described, but other situations can be derived from the above examples.

The first lens L1, the second lens L2, the third lens L3, the fourth lens L4, and the fifth lens L5 are all made of plastic.

Further, the optical system 100 satisfies a condition: R12/f=0.599; where R12 is a radius of curvature of the image side surface S2 of the first lens L1 at the optical axis 110, and f is an effective focal length of the optical system 100. When the above condition is satisfied, the ratio of the radius of curvature of the image side surface S2 of the first lens L1 at the optical axis 110 to the effective focal length of the optical system 100 can be reasonably configured, cooperating with the image side surface S2 of the first lens L1 having the concave shape, it is beneficial to enlarge the angle of field of view of the optical system 100, enable the optical system 100 to have wide-angle characteristics, and while it is also beneficial to prevent the image side surface S2 of the first lens L1 from being excessively curved in shape, thereby helping to reduce the designing and forming difficulty of the first lens L1.

The optical system 100 satisfies a condition: f12/f45=−0.450; where f12 is a combined focal length of the first lens L1 and the second lens L2, and f45 is a combined focal length of the fourth lens L4 and the fifth lens L5. When the above condition is satisfied, the ratio of the combined focal length of the first lens L1 and the second lens L2 to the combined focal length of the fourth lens L4 and the fifth lens L5 can be reasonably configured, which facilitates the large-angle light incident to the first lens L1 and the second lens L2. As such, it is beneficial to realize the wide-angle characteristics of the optical system 100, and while it is also beneficial for the fourth lens L4 and the fifth lens L5 to correct the aberration of the optical system 100, and beneficial to shorten the total length of the optical system 100. In addition, it is also beneficial to for two lens group at the object side and the image side of the third lens L3 to match with two convex surfaces of the third lens L3, which is beneficial to suppress the distortion of the optical system 100, improving the image restitution degree of the optical system 100.

The optical system 100 satisfies a condition: f2/f3=1.682; where f2 is an effective focal length of the second lens L2, and f3 is an effective focal length of the third lens L3. When the above condition is satisfied, a ratio of the effective focal length the second lens L2 to the effective focal length of the third lens L3 can be reasonably configured, which is beneficial for the second lens L2 to match with the first lens L1, thereby helping to correct the severe spherical aberrations generated by the first lens L1. In addition, it is also beneficial for the third lens L3 to provide sufficient positive refractive power for the optical system 100, thereby shortening the total length of the optical system 100, and while the third lens L3 has sufficient central thickness to suppress the increase in sensitivity cause by the light deflection angle becoming larger. As such, it is beneficial to correct the aberration of the optical system 100 and suppress large-angle optical distortion, thereby helping to solve the problems that the severely distortion generated when the optical system 100 realizes the wide-angle characteristics causes the edge of the captured picture to be distorted.

The optical system 100 satisfies a condition: $\Sigma T/\Sigma CT=0.338$; where $\Sigma T$ is the sum of the interval between two adjacent lenses among the first lens L1, the second lens L2, the third lens L3, the fourth lens L4, and the fifth lens L5 on the optical axis 110, $\Sigma CT$ is the sum of the thicknesses of the first lens L1, the second lens L2, the third lens L3, the fourth lens L4, and the fifth lens L5 on the optical axis 110. When the above condition is satisfied, the center thicknesses of and the intervals between the five lenses in the optical system 100 can be reasonably configured, which is beneficial to a more compact structure of the optical system 100, and thus it is beneficial to shorten the total optical length, and while it also prevents the center thicknesses of and the intervals between the five lenses from being not too extreme, which helps to improve the manufacturability of the optical system 100.

The optical system 100 satisfies a condition: $\Sigma T1/CT1=2.167$; where $\Sigma T1$ is a distance from a portion of the object side surface S1 having the maximum effective aperture to a portion of the image side surface S2 having the maximum effective aperture of the first lens L1 in a direction of the optical axis 110, CT1 is a thickness of the first lens L1 on the optical axis 110. When the above condition is satisfied, the ratio of the edge thickness to the center thickness of the first lens L1 can be reasonably configured, such that the first lens L1 will not be excessively curved in shape, which is beneficial to the design and forming of the first lens L1, thereby improving the manufacturability of the first lens L1, and while it is also beneficial to reduce the thickness of the first lens L1 as much as possible, thereby reducing the size of the front portion of the optical system 100.

The optical system 100 satisfies a condition: Y11/Y52=0.989; where Y11 is the maximum effective aperture of the object side surface S1 of the first lens L1, and Y52 is the maximum effective aperture of the image side surface S10 of the fifth lens L5. When the above condition is satisfied, the ratio of the maximum effective aperture of the object side surface S1 of the first lens L1 to the maximum effective aperture of the image side surface S10 of the fifth lens L5 can be reasonably configured, such that an aperture of the front portion is similar to an aperture of the rear portion of the optical system 100. The structure of optical system 100 can have a better symmetry, which is more beneficial to correct the aberration of the optical system 100, suppressing the distortion of the optical system 100, and thereby improving the imaging quality of the optical system 100.

The optical system 100 satisfies a condition: BFL/f=0.645; where BFL is a distance from the image side surface S10 of the fifth lens L5 to the imaging surface of the optical system 100 on the optical axis 110. When the above condition is satisfied, the ratio of the optical back focus to the effective focal length of the optical system 100 can be reasonably configured, such that the optical system 100 has enough back focus space to move back and forth to focus, and it also easier for the optical system 100 to match with a photosensitive element, and thus which is beneficial to improve the imaging quality of the optical system 100. In addition, the optical back focus of the optical system 100 is not too long, such that is beneficial to shorten the total length of the optical system 100.

The optical system 100 satisfies a condition: FOV/ImgH=55.556 deg/mm; where FOV is the maximum angle of field of view of the optical system 100, and ImgH is half of the image height of the optical system 100 corresponding to the maximum angle of field of view. When the above condition is satisfied, the ratio of the maximum angle of field of view to the half-image height of the optical system 100 can be reasonably configured, which is beneficial to expand the angle of field of view of the optical system 100, achieving wide-angle characteristics, and enabling the optical system 100 to capture pictures in a wider range. Moreover, it is also beneficial to increase the size of the imaging surface of the optical system 100, such that the optical system 100 can match with a larger-sized photosensitive element, thereby helping to increase the pixels of the optical system 100. In addition, the angle of field of view of the optical system 100 is not too large, which is beneficial to the correction of the distortion and aberration of the optical system 100.

The optical system 100 satisfies a condition: |DIST|=4.600%; where DIST is the maximum of the optical distortion of the optical system 100. When the above condition is satisfied, the distortion of the optical system 100 can be suppressed while realizing the wide-angle characteristics, thereby improving the realism of the picture restitution and enhancing the consumer's experience.

The optical system 100 satisfies a condition: n2+n4=3.322; where n2 is the refractive index of the second lens L2 at a wavelength of 587.5618 nm, and n4 is the refractive index of the fourth lens L4 at the wavelength of 587.5618 nm. When the above condition is satisfied, the refractive indices of the second lens L2 and the fourth lens L4 can be reasonably configured, thereby improving the modulation transfer function of the optical system 100, facilitating correcting the chromatic aberration of the optical system 100, and improving the resolution of the optical system 100.

In addition, parameters of the optical system 100 are shown in Table 1. The image surface S3 in Table 1 can be understood as an imaging surface of the optical system 100. The elements from the object surface (not shown in figures) to the image surface 13 are arranged in the order of the elements in Table 1 from top to bottom. The Y radius in Table 1 is the radius of curvature of the object side surface or image side surface indicated by corresponding surface number at the optical axis 110. The surface numbers 1 and 2 indicate the object side surface S1 and the image side surface S2 of the first lens L1, respectively. That is, in the same lens, the surface with the smaller surface number is the object side surface, and the surface with the larger surface number is the image side surface. In the "thickness" parameter column of the first lens, the first value is the thickness of this lens on the optical axis 110, and the second value is a distance from the image side surface of this lens to the next surface in a direction toward the image side on the optical axis 110.

It should be noted that in this embodiment and the following various embodiments, the optical system 100 may not be provided with an infrared filter L6, but in this case, a distance from the image side surface S10 to the image side surface S13 of the fifth lens L5 remains unchanged.

In the first embodiment, the effective focal length of the optical system 10 is indicated by f, and f=1.309 mm. The f-number is indicated by FNO, and FNO=2.30. The maximum angle of field of view is indicated by FOV, and FOV=120 deg. The total optical length is indicated by TTL, and TTL=4.57 mm. In the first embodiment and other embodiments, the optical system 100 satisfies: 115 deg≤FOV≤125 deg. It can be seen that the optical system 100 has wide-angle characteristics and can meet the requirements of capturing in a wide range. In addition, the optical system 100 has wide-angle characteristics and small distortion, high image restitution, and good imaging quality.

The reference wavelengths of the focal length, the refractive index, and the Abbe number of each lens are all 587.5618 nm, and which are the same in other embodiments.

TABLE 1

First Embodiment
f = 1.309 mm, FNO = 2.30, FOV = 120.0 deg, TTL = 4.57 mm

| Surface Number | Surface Name | Surface Shape | Y radius (mm) | Thickness (mm) | Material | Refractive index | Abbe number | Focal Length (mm) |
|---|---|---|---|---|---|---|---|---|
|  | Object Surface | Spherical | Infinite | 1000.00 |  |  |  |  |
| S1 | First Lens | Aspherical | 38.501 | 0.300 | Plastic | 1.535 | 55.751 | −1.500 |
| S2 |  | Aspherical | 0.784 | 0.374 |  |  |  |  |
| S3 | Second Lens | Aspherical | 1.077 | 0.623 | Plastic | 1.661 | 20.370 | 2.656 |
| S4 |  | Aspherical | 2.146 | 0.220 |  |  |  |  |
|  | Stop | Spherical | Infinite | 0.102 |  |  |  |  |
| S5 | Third Lens | Aspherical | 2.988 | 0.831 | Plastic | 1.535 | 55.751 | 1.579 |
| S6 |  | Aspherical | −1.063 | 0.050 |  |  |  |  |
| S7 | Fourth Lens | Aspherical | −2.916 | 0.287 | Plastic | 1.661 | 20.370 | −3.952 |
| S8 |  | Aspherical | 25.946 | 0.270 |  |  |  |  |
| S9 | Fifth Lens | Aspherical | 1.047 | 0.964 | Plastic | 1.535 | 55.751 | 2.706 |
| S10 |  | Aspherical | 2.571 | 0.290 |  |  |  |  |
| S11 | Infrared Filter | Spherical | Infinite | 0.210 | Glass | 1.517 | 64.167 |  |
| S12 |  | Spherical | Infinite | 0.344 |  |  |  |  |
| S13 | Image Surface | Spherical | Infinite | 0.000 |  |  |  |  |

Further, the aspheric coefficients of the image side surface or the object side surface of the lenses of the optical system 100 are shown in Table 2. The surface numbers of S1 to S10 indicate the image side surface or the object side surface S1 to S10, respectively. K to A20 from top to bottom respectively represent the types of aspherical coefficients, where K represents the conic coefficient, A4 represents the fourth-order aspheric coefficient, A6 represents the sixth-order aspheric coefficient, and A8 represents the eighth-order aspheric coefficient, and so on. In addition, the aspheric coefficient formula is as follows:

$$Z = \frac{cr^2}{1 + \sqrt{1 - (k+1)c^2 r^2}} + \sum_i A_i r^i$$

where Z is a distance from a corresponding point on an aspheric surface to a plane tangent to a vertex of the surface, r is a distance from a corresponding point on the aspheric surface to the optical axis 110, c is a curvature of the vertex of the aspheric surface, k is a conic coefficient, and Ai is a coefficient corresponding to the $i^{th}$ high-order term in the aspheric surface shape formula.

TABLE 2

First Embodiment
Aspheric Coefficient

| Surface Number | S1 | S2 | S3 | S4 | S5 |
|---|---|---|---|---|---|
| K | −9.900E+01 | −1.438E+00 | −1.577E−01 | 1.887E+00 | 7.901E+00 |
| A4 | 9.937E−02 | 2.474E−01 | −8.695E−02 | 2.111E−01 | −6.801E−02 |
| A6 | −6.255E−02 | −1.267E+00 | −3.478E−01 | 1.540E+00 | 7.344E−01 |
| A8 | −1.709E−02 | 8.362E+00 | 4.259E+00 | −3.249E+01 | −1.435E+01 |
| A10 | 6.592E−02 | −3.402E+01 | −2.588E+01 | 4.490E+02 | 1.289E+02 |
| A12 | −5.478E−02 | 7.942E+01 | 8.687E+01 | −3.552E+03 | −7.162E+02 |
| A14 | 2.435E−02 | −1.119E+02 | −1.710E+02 | 1.746E+04 | 2.486E+03 |
| A16 | −6.297E−03 | 9.579E+01 | 2.015E+02 | −5.218E+04 | −5.276E+03 |
| A18 | 8.941E−04 | −4.604E+01 | −1.322E+02 | 8.660E+04 | 6.283E+03 |
| A20 | −5.389E−05 | 9.538E+00 | 3.705E+01 | −6.111E+04 | −3.218E+03 |

| Surface Number | S6 | S7 | S8 | S9 | S10 |
|---|---|---|---|---|---|
| K | 4.454E−01 | −8.690E+01 | −9.900E+01 | −5.005E+00 | −5.690E−01 |
| A4 | 6.444E−01 | 3.021E−01 | −1.872E−01 | −1.131E−01 | −2.744E−02 |
| A6 | −1.221E+01 | −1.071E+01 | −1.639E+00 | 1.040E−01 | −1.155E−01 |
| A8 | 8.469E+01 | 6.881E+01 | 9.201E+00 | −5.969E−01 | 6.248E−02 |
| A10 | −3.618E+02 | −2.675E+02 | −2.613E+01 | 1.730E+00 | 5.955E−02 |
| A12 | 1.012E+03 | 6.751E+02 | 4.677E+01 | −2.734E+00 | −1.091E−01 |
| A14 | −1.878E+03 | −1.122E+03 | −5.492E+01 | 2.552E+00 | 7.303E−02 |
| A16 | 2.242E+03 | 1.182E+03 | 4.123E+01 | −1.410E+00 | −2.574E−02 |
| A18 | −1.569E+03 | −7.062E+02 | −1.793E+01 | 4.265E−01 | 4.711E−03 |
| A20 | 4.903E+02 | 1.806E+02 | 3.435E+00 | −5.448E−02 | −3.525E−04 |

In addition, FIG. 2 includes a longitudinal spherical aberration diagram of the optical system 100, which shows that light of different wavelengths deviates from the focal point after transmitting through the lenses. The ordinate of the longitudinal spherical aberration diagram represents the normalized pupil coordinator from the center of the pupil to the edge of the pupil, and the abscissa thereof represents the distance from the imaging surface to the intersection of the light and the optical axis 110 (in unit of mm). It can be seen from the longitudinal spherical aberration diagram that the deviation degree of the convergence point of the light of various wavelength in the first embodiment tends to be the same, and the diffuse spot or chromatic halo in the imaged picture is effectively prevented. FIG. 2 further includes an astigmatic field curves diagram of the optical system 100, where the S curve represents the sagittal field curvature at 587.5618 nm, and the T curve represents the meridian field curvature at 587.5618 nm. It can be seen from the diagram that the field curvature of the optical system 100 is small, the field curvature and astigmatism of each field of view are well corrected, and clear imaging can be achieved at the center and edges of the field of view. FIG. 2 further includes a distortion diagram of the optical system 100. It can be seen from the diagram that the image distortion caused by the main beam is small, and the imaging quality of the system is excellent.

Second Embodiment

Figure 3:
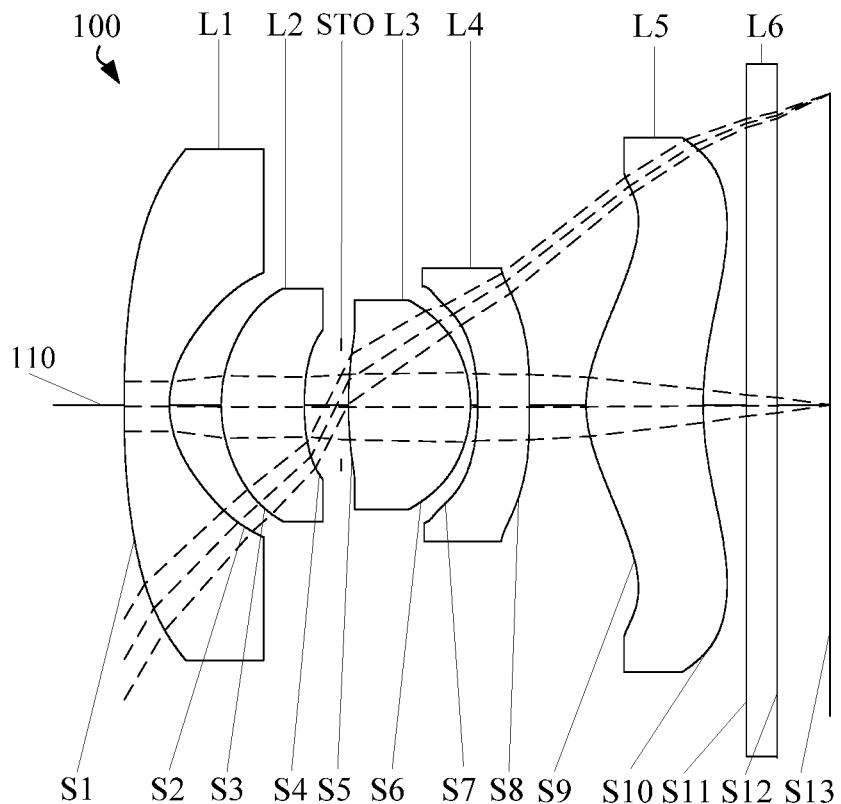
FIG. 3 is a schematic view of an optical system according to a second embodiment of the present disclosure.
Figure 4:
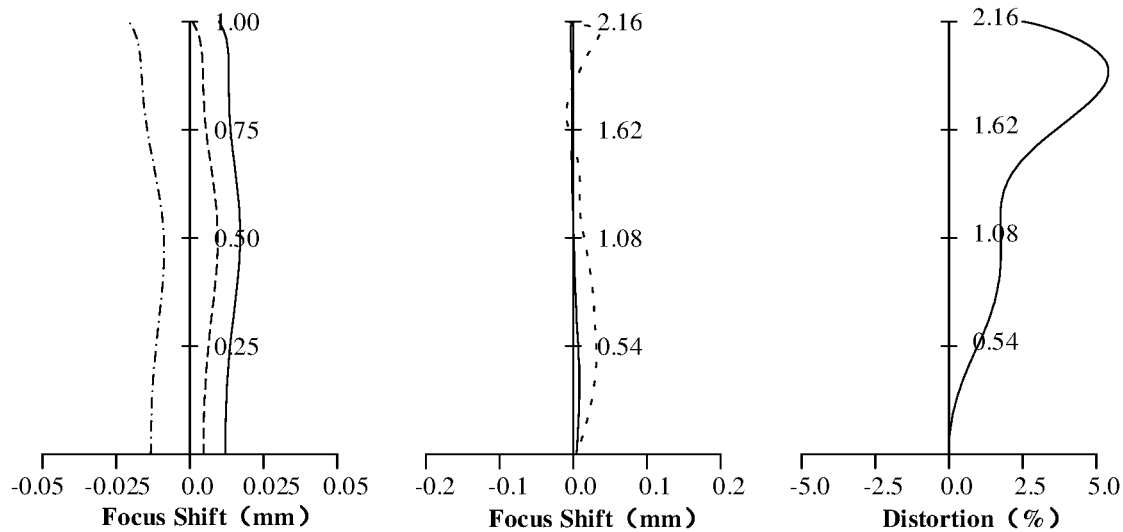
FIG. 4 is a graph showing longitudinal spherical aberration, astigmatism, and distortion of the optical system of FIG. 3.

FIG. 3 is a schematic view of an optical system 100 according to a second embodiment. The optical system 100 includes, successively in order from an object side to an image side, a first lens L1 having a negative refractive power, a second lens L2 having a positive refractive power, a stop STO, a third lens L3 having a positive refractive power, a fourth lens L4 having a negative refractive power, and a fifth lens L5 having a positive refractive power. FIG. 4 is a graph showing longitudinal spherical aberration, astigmatism, and distortion of the optical system 100 according to the second embodiment in order from left to right.

An object side surface S1 of the first lens L1 is convex near an optical axis 110 and convex at a circumference thereof.

An image side surface S2 of the first lens L1 is concave near the optical axis 110 and concave at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and convex at a circumference thereof.

An image side surface S6 of the third lens L3 is convex near the optical axis 110 and convex at the circumference thereof.

An object side surface S7 of the fourth lens L4 is concave near the optical axis 110 and concave at a circumference thereof.

An image side surface S8 of the fourth lens L4 is concave near the optical axis 110 and convex at the circumference thereof.

An object side surface S9 of the fifth lens L5 is convex near the optical axis 110 and concave at a circumference thereof.

An image side surface S10 of the fifth lens L5 is concave near the optical axis 110 and convex at the circumference thereof.

The object side surfaces and the image side surfaces of the first lens L1, the second lens L2, the third lens L3, the fourth lens L4, and the fifth lens L5 are all aspherical.

The first lens L1, the second lens L2, the third lens L3, the fourth lens L4, and the fifth lens L5 are all made of plastic.

In addition, various parameters of the optical system 100 are shown in Table 3, and the definition of each of the parameters can be obtained from the first embodiment, which will not be repeated herein.

TABLE 3

Second Embodiment
f = 1.207 mm, FNO = 2.08, FOV = 120.42 deg, TTL = 4.51 mm

| Surface Number | Surface Name | Surface Shape | Y radius (mm) | Thickness (mm) | Material | Refractive index | Abbe number | Focal Length (mm) |
|---|---|---|---|---|---|---|---|---|
| | Object Surface | Spherical | Infinite | 1005 | | | | |
| S1 | First | Aspherical | 15.519 | 0.309 | Plastic | 1.535 | 55.751 | −1.450 |
| S2 | Lens | Aspherical | 0.734 | 0.353 | | | | |
| S3 | Second | Aspherical | 1.011 | 0.567 | Plastic | 1.671 | 19.244 | 2.829 |
| S4 | Lens | Aspherical | 1.676 | 0.252 | | | | |
| | Stop | Spherical | Infinite | 0.050 | | | | |
| S5 | Third | Aspherical | 2.921 | 0.833 | Plastic | 1.535 | 55.751 | 1.445 |
| S6 | Lens | Aspherical | −0.947 | 0.050 | | | | |
| S7 | Fourth | Aspherical | −2.258 | 0.352 | Plastic | 1.661 | 20.370 | −3.041 |
| S8 | Lens | Aspherical | 19.365 | 0.388 | | | | |
| S9 | Fifth | Aspherical | 0.822 | 0.799 | Plastic | 1.535 | 55.751 | 2.058 |
| S10 | Lens | Aspherical | 2.145 | 0.296 | | | | |
| S11 | Infrared | Spherical | Infinite | 0.210 | Glass | 1.517 | 64.167 | |
| S12 | Filter | Spherical | Infinite | 0.360 | | | | |
| S13 | Image Surface | Spherical | Infinite | 0.000 | | | | |

Further, the aspheric coefficients of the image side surface or the object side surface of the lenses of the optical system 100 are shown in Table 4, and the definition of each of the parameters can be obtained from the first embodiment, and will not be repeated herein.

TABLE 4

Second Embodiment
Aspheric Coefficient

| Surface Number | S1 | S2 | S3 | S4 | S5 |
|---|---|---|---|---|---|
| K | 5.135E+01 | −1.291E+00 | 8.018E−02 | 6.238E+00 | 2.193E+00 |
| A4 | 1.576E−01 | 3.118E−01 | −7.003E−02 | 2.076E−01 | 1.218E−01 |
| A6 | −2.761E−01 | −9.886E−01 | −1.847E−01 | −4.431E−02 | −3.230E+00 |
| A8 | 3.044E−01 | 3.715E+00 | 1.420E+00 | −8.944E−01 | 6.555E+01 |
| A10 | −2.146E−01 | −1.732E+01 | −8.196E+00 | 7.837E+01 | −8.424E+02 |
| A12 | 1.008E−01 | 5.145E+01 | 2.606E+01 | −7.277E+02 | 6.548E+03 |
| A14 | −3.109E−02 | −8.628E+01 | −3.259E+01 | 3.274E+03 | −3.134E+04 |
| A16 | 5.958E−03 | 8.154E+01 | −7.013E+00 | −7.028E+03 | 8.933E+04 |
| A18 | −6.286E−04 | −3.918E+01 | 5.610E+01 | 4.521E+03 | −1.377E+05 |
| A20 | 2.677E−05 | 6.893E+00 | −3.892E+01 | 2.797E+03 | 8.714E+04 |

| Surface Number | S6 | S7 | S8 | S9 | S10 |
|---|---|---|---|---|---|
| K | 2.265E−01 | −3.534E+00 | −7.638E+01 | −3.847E+00 | −4.240E+00 |
| A4 | −6.698E−01 | −1.473E+00 | −1.455E+00 | −1.693E−01 | −7.300E−02 |
| A6 | 1.121E+01 | 1.447E+01 | 6.787E+00 | 4.304E−01 | 4.602E−02 |
| A8 | −1.019E+02 | −1.066E+02 | −2.569E+01 | −8.465E−01 | −5.199E−02 |
| A10 | 5.508E+02 | 5.074E+02 | 7.093E+01 | 1.054E+00 | 2.830E−02 |
| A12 | −1.952E+03 | −1.656E+03 | −1.380E+02 | −8.652E−01 | −4.812E−03 |
| A14 | 4.516E+03 | 3.643E+03 | 1.820E+02 | 4.646E−01 | −1.871E−03 |
| A16 | −6.514E+03 | −5.161E+03 | −1.536E+02 | −1.572E−01 | 1.074E−03 |
| A18 | 5.285E+03 | 4.258E+03 | 7.456E+01 | 3.031E−02 | −2.099E−04 |
| A20 | −1.833E+03 | −1.546E+03 | −1.576E+01 | −2.522E−03 | 1.584E−05 |

According to the information of parameters described above, the following data can be derived.

| | | | |
|---|---|---|---|
| R12/f | 0.608 | Y11/Y52 | 0.957 |
| f12/f45 | −0.597 | BFL/f | 0.717 |
| f2/13 | 1.958 | FOV/ImgH (deg/mm) | 55.750 |
| ΣT/ΣCT | 0.382 | DIST (%) | 5.000 |
| ET1/CT1 | 2.006 | n2 + n4 | 3.332 |

In addition, it can be seen from the aberration diagram in FIG. 4 that the longitudinal spherical aberration, astigmatism, and distortion of the optical system 100 are well controlled, such that the optical system 100 of this embodiment has good imaging quality.

Third Embodiment

Figure 5:
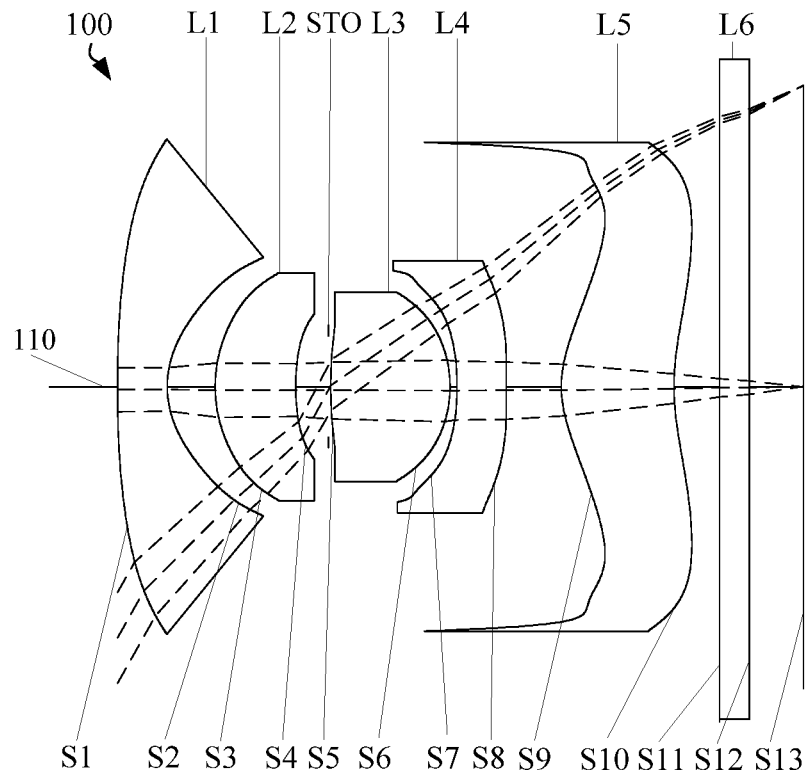
FIG. 5 is a schematic view of an optical system according to a third embodiment of the present disclosure.
Figure 6:
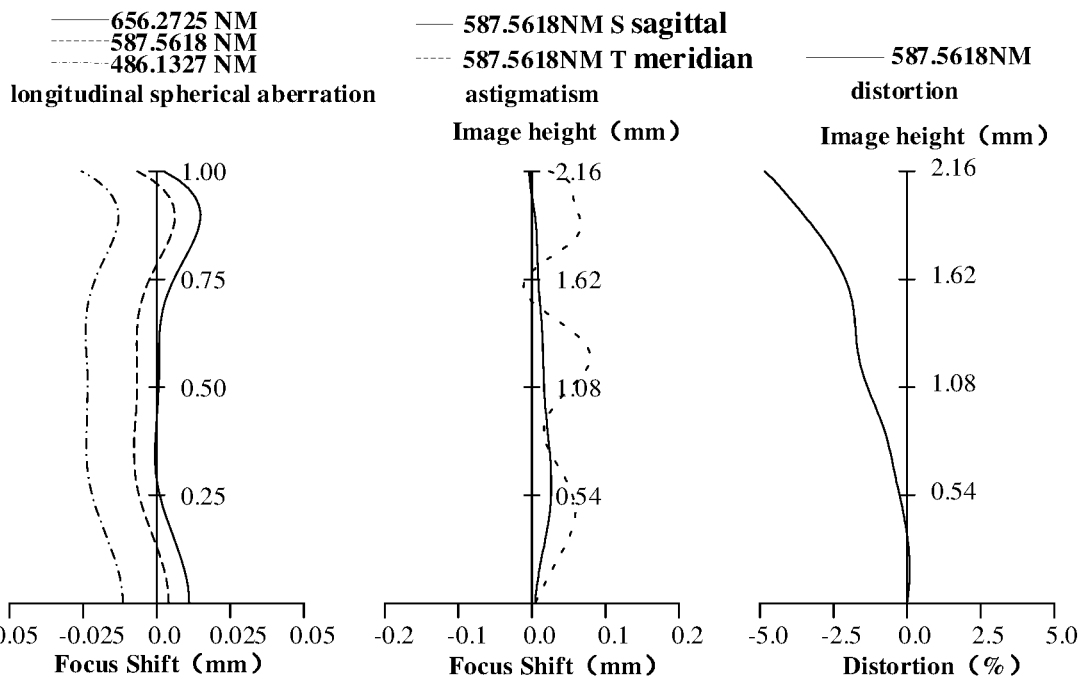
FIG. 6 is a graph showing longitudinal spherical aberration, astigmatism, and distortion of the optical system of FIG. 5.

Referring to FIGS. 5 and 6, FIG. 5 is a schematic view of an optical system 100 according to a third embodiment. The optical system 100 includes, successively in order from an object side to an image side, a first lens L1 having a negative refractive power, a second lens L2 having a positive refractive power, a stop STO, a third lens L3 having a positive refractive power, a fourth lens L4 having a negative refractive power, and a fifth lens L5 having a positive refractive power. FIG. 6 is a graph showing longitudinal spherical aberration, astigmatism, and distortion of the optical system 100 according to the third embodiment in order from left to right.

An object side surface S1 of the first lens L1 is convex near an optical axis 110 and convex at a circumference thereof.

An image side surface S2 of the first lens L1 is concave near the optical axis 110 and concave at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and convex at a circumference thereof.

An image side surface S6 of the third lens L3 is convex near the optical axis 110 and convex at the circumference thereof.

An object side surface S7 of the fourth lens L4 is concave near the optical axis 110 and concave at a circumference thereof.

An image side surface S8 of the fourth lens L4 is concave near the optical axis 110 and convex at the circumference thereof.

An object side surface S9 of the fifth lens L5 is convex near the optical axis 110 and concave at a circumference thereof.

An image side surface S10 of the fifth lens L5 is concave near the optical axis 110 and convex at the circumference thereof.

The object side surfaces and the image side surfaces of the first lens L1, the second lens L2, the third lens L3, the fourth lens L4, and the fifth lens L5 are all aspherical.

The first lens L1, the second lens L2, the third lens L3, the fourth lens L4, and the fifth lens L5 are all made of plastic.

In addition, various parameters of the optical system 100 are shown in Table 5, and the definition of each of the parameters can be obtained from the first embodiment, which will not be repeated herein.

TABLE 5

Third Embodiment
f = 1.255 mm, FNO = 2.25, FOV = 122.13 deg, TTL = 4.50 mm

| Surface Number | Surface Name | Surface Shape | Y radius (mm) | Thickness (mm) | Material | Refractive index | Abbe number | Focal Length (mm) |
|---|---|---|---|---|---|---|---|---|
| | Object Surface | Spherical | Infinite | 1000 | | | | |
| S1 | First Lens | Aspherical | 23.098 | 0.350 | Plastic | 1.536 | 54.958 | −1.413 |
| S2 | | Aspherical | 0.729 | 0.338 | | | | |
| S3 | Second Lens | Aspherical | 0.995 | 0.569 | Plastic | 1.661 | 20.370 | 2.831 |
| S4 | | Aspherical | 1.643 | 0.231 | | | | |
| | Stop | Spherical | Infinite | 0.016 | | | | |
| S5 | Third Lens | Aspherical | 3.043 | 0.844 | Plastic | 1.535 | 55.740 | 1.402 |
| S6 | | Aspherical | −0.900 | 0.050 | | | | |
| S7 | Fourth Lens | Aspherical | −2.173 | 0.348 | Plastic | 1.661 | 20.400 | −2.798 |
| S8 | | Aspherical | 13.171 | 0.388 | | | | |
| S9 | Fifth Lens | Aspherical | 0.794 | 0.796 | Plastic | 1.537 | 54.300 | 2.126 |
| S10 | | Aspherical | 1.695 | 0.323 | | | | |
| S11 | Infrared Filter | Spherical | Infinite | 0.210 | Glass | 1.517 | 64.167 | |
| S12 | | Spherical | Infinite | 0.385 | | | | |
| S13 | Image Surface | Spherical | Infinite | 0.000 | | | | |

Further, the aspheric coefficients of the image side surface or the object side surface of the lenses of the optical system 100 are shown in Table 6, and the definition of each of the parameters can be obtained from the first embodiment, and will not be repeated herein.

TABLE 6

Third Embodiment
Aspheric Coefficient

| Surface Number | S1 | S2 | S3 | S4 | S5 |
|---|---|---|---|---|---|
| K | 1.901E+01 | −1.284E+00 | 6.347E−02 | 5.912E+00 | 7.007E−01 |
| A4 | 1.504E−01 | 2.757E−01 | −5.910E−02 | −2.462E−01 | 3.396E−01 |
| A6 | −2.572E−01 | 7.254E−01 | 6.562E−01 | 1.667E+01 | −1.550E+01 |
| A8 | 2.756E−01 | −1.190E+01 | −1.229E+01 | −3.256E+02 | 3.986E+02 |
| A10 | −1.881E−01 | 5.319E+01 | 8.455E+01 | 3.974E+03 | −6.023E+03 |
| A12 | 8.579E−02 | −1.408E+02 | −3.196E+02 | −3.028E+04 | 5.539E+04 |
| A14 | −2.606E−02 | 2.481E+02 | 7.428E+02 | 1.453E+05 | −3.157E+05 |
| A16 | 5.049E−03 | −2.816E+02 | −1.056E+03 | −4.264E+05 | 1.085E+06 |
| A18 | −5.609E−04 | 1.847E+02 | 8.477E+02 | 6.989E+05 | −2.046E+06 |
| A20 | 2.684E−05 | −5.272E+01 | −2.966E+02 | −4.910E+05 | 1.613E+06 |

| Surface Number | S6 | S7 | S8 | S9 | S10 |
|---|---|---|---|---|---|
| K | 2.152E−01 | −4.115E+00 | 7.185E+01 | −4.278E+00 | −8.525E+00 |
| A4 | −4.204E−01 | −1.402E+00 | −1.516E+00 | −1.589E−01 | −1.760E−01 |
| A6 | 1.866E+00 | 1.118E+01 | 7.689E+00 | 2.061E−01 | 2.251E−01 |
| A8 | 2.950E+00 | −6.308E+01 | −3.323E+01 | −3.011E−01 | −2.583E−01 |
| A10 | −4.581E+02 | 2.102E+02 | 1.075E+02 | 3.911E−01 | 2.060E−01 |
| A12 | 2.673E+03 | −4.914E+02 | −2.443E+02 | −4.025E−01 | −1.028E−01 |
| A14 | −8.563E+03 | 8.965E+02 | 3.700E+02 | 2.836E−01 | 2.841E−02 |
| A16 | 1.593E+04 | −1.319E+O3 | −3.516E+02 | −1.255E−01 | −3.250E−03 |
| A18 | −1.619E+04 | 1.345E+03 | 1.889E+02 | 3.082E−02 | −1.681E−04 |
| A20 | 6.975E+03 | −6.351E+02 | −4.358E+01 | −3.151E−03 | 5.382E−05 |

According to the information of parameters described above, the following data can be derived.

| R12/f | 0.581 | Y11/Y52 | 1.013 |
|---|---|---|---|
| f12/f45 | −0.404 | BFL/f | 0.731 |
| f2/f3 | 2.019 | FOV/ImgH (deg/mm) | 56.542 |

-continued

| ΣT/ΣCT | 0.352 | DIST (%) | 4.830 |
|---|---|---|---|
| ET1/CT1 | 1.957 | n2 + n4 | 3.322 |

In addition, it can be seen from the aberration diagram in FIG. 6 that the longitudinal spherical aberration, astigma tism, and distortion of the optical system 100 are well controlled, such that the optical system 100 of this embodiment has good imaging quality.

Fourth Embodiment

Figure 7:
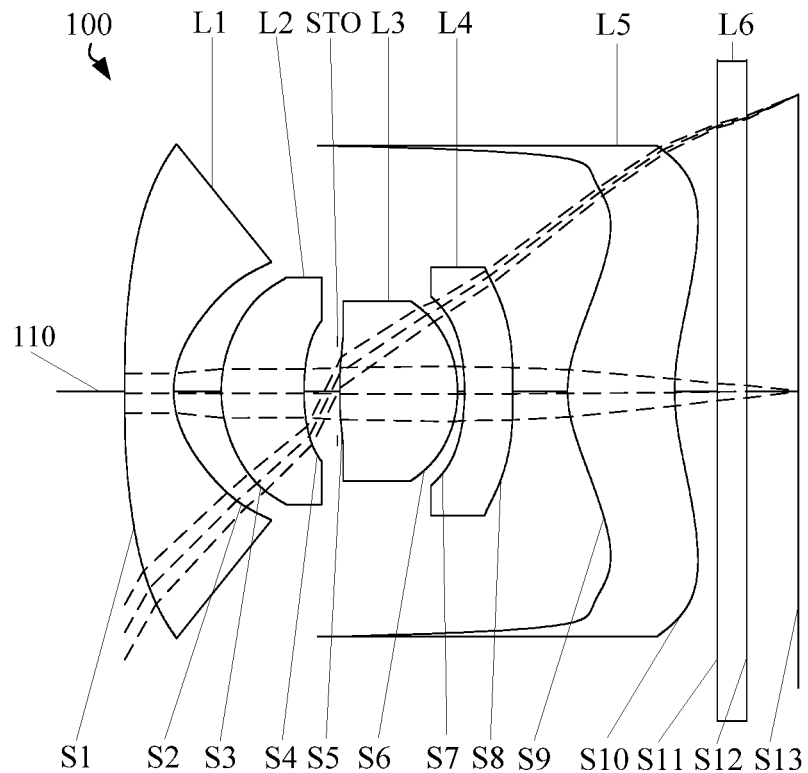
FIG. 7 is a schematic view of an optical system according to a fourth embodiment of the present disclosure.
Figure 8:
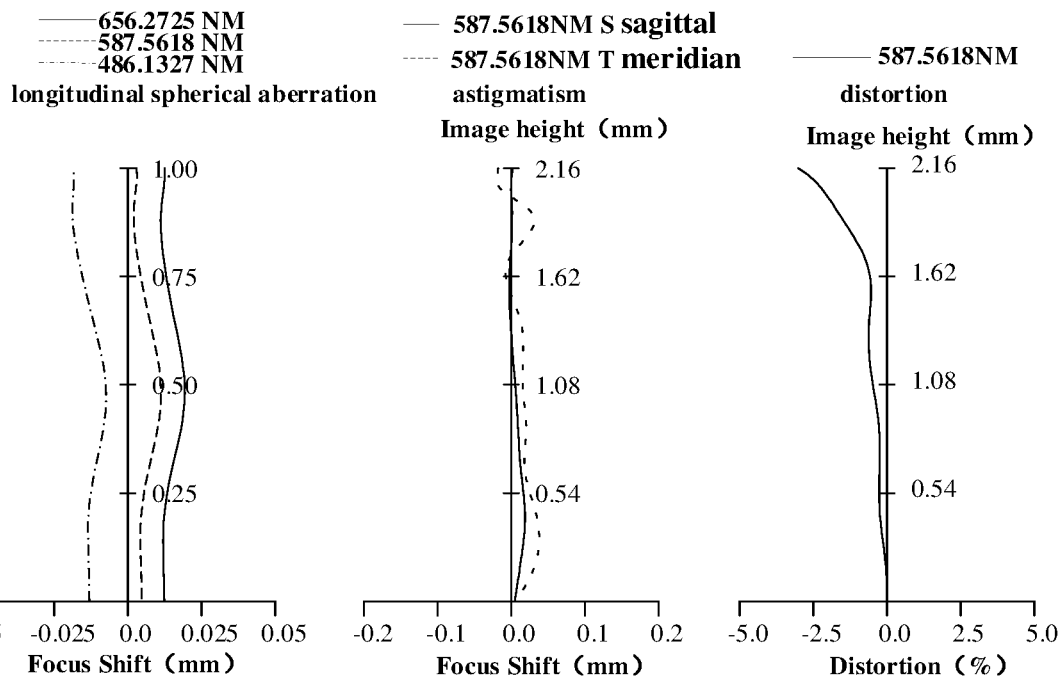
FIG. 8 is a graph showing longitudinal spherical aberration, astigmatism, and distortion of the optical system of FIG. 7.

FIG. 7 is a schematic view of an optical system 100 according to a fourth embodiment. The optical system 100 includes, successively in order from an object side to an image side, a first lens L1 having a negative refractive power, a second lens L2 having a positive refractive power, a stop STO, a third lens L3 having a positive refractive power, a fourth lens L4 having a negative refractive power, and a fifth lens L5 having a positive refractive power. FIG. 8 is a graph showing longitudinal spherical aberration, astigmatism, and distortion of the optical system 100 according to the fourth embodiment in order from left to right.

An object side surface S1 of the first lens L1 is convex near an optical axis 110 and convex at a circumference thereof.

An image side surface S2 of the first lens L1 is concave near the optical axis 110 and concave at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and convex at a circumference thereof.

An image side surface S6 of the third lens L3 is convex near the optical axis 110 and convex at the circumference thereof.

An object side surface S7 of the fourth lens L4 is concave near the optical axis 110 and concave at a circumference thereof.

An image side surface S8 of the fourth lens L4 is convex near the optical axis 110 and convex at the circumference thereof.

An object side surface S9 of the fifth lens L5 is convex near the optical axis 110 and concave at a circumference thereof.

An image side surface S10 of the fifth lens L5 is concave near the optical axis 110 and convex at the circumference thereof.

The object side surfaces and the image side surfaces of the first lens L1, the second lens L2, the third lens L3, the fourth lens L4, and the fifth lens L5 are all aspherical.

The first lens L1, the second lens L2, the third lens L3, the fourth lens L4, and the fifth lens L5 are all made of plastic.

In addition, various parameters of the optical system 100 are shown in Table 7, and the definition of each of the parameters can be obtained from the first embodiment, which will not be repeated herein.

TABLE 7

Fourth Embodiment
f = 1.235 mm, FNO = 2.45, FOV = 121.98 deg, TTL = 4.83 mm

| Surface Number | Surface Name | Surface Shape | Y radius (mm) | Thickness (mm) | Material | Refractive index | Abbe number | Focal Length (mm) |
|---|---|---|---|---|---|---|---|---|
| | Object Surface | Spherical | Infinite | Infinite | | | | |
| S1 | First | Aspherical | 21.319 | 0.352 | Plastic | 1.535 | 55.790 | −1.421 |
| S2 | Lens | Aspherical | 0.730 | 0.342 | | | | |
| S3 | Second | Aspherical | 0.994 | 0.594 | Plastic | 1.661 | 20.370 | 2.778 |
| S4 | Lens | Aspherical | 1.651 | 0.238 | | | | |
| | Stop | Spherical | Infinite | 0.018 | | | | |
| S5 | Third | Aspherical | 3.088 | 0.846 | Plastic | 1.535 | 55.790 | 1.411 |
| S6 | Lens | Aspherical | −0.904 | 0.050 | | | | |
| S7 | Fourth | Aspherical | −2.071 | 0.346 | Plastic | 1.661 | 20.400 | −3.204 |
| S8 | Lens | Aspherical | −100.000 | 0.393 | | | | |
| S9 | Fifth | Aspherical | 0.813 | 0.769 | Plastic | 1.535 | 55.788 | 2.286 |
| S10 | Lens | Aspherical | 1.624 | 0.307 | | | | |
| S11 | Infrared | Spherical | Infinite | 0.211 | Glass | 1.517 | 64.167 | |
| S12 | Filter | Spherical | Infinite | 0.369 | | | | |
| S13 | Image Surface | Spherical | Infinite | 0.000 | | | | |

Further, the aspheric coefficients of the image side surface or the object side surface of the lenses of the optical system 100 are shown in Table 8, and the definition of each of the parameters can be obtained from the first embodiment, and will not be repeated herein.

TABLE 8

Fourth Embodiment
Aspheric Coefficient

| Surface Number | S1 | S2 | S3 | S4 | S5 |
|---|---|---|---|---|---|
| K | 4.018E+01 | −1.274E+00 | 6.809E−02 | 5.968E+00 | −4.996E−01 |
| A4 | 1.465E−01 | 3.954E−01 | −3.368E−02 | −1.434E−02 | 2.843E−01 |

TABLE 8-continued

Fourth Embodiment
Aspheric Coefficient

| | | | | | |
|---|---|---|---|---|---|
| A6 | −2.381E−01 | −1.733E+00 | −6.819E−01 | 9.135E+00 | −1.856E+01 |
| A8 | 2.341E−01 | 7.693E+00 | 5.813E+00 | −1.816E+02 | 7.277E+02 |
| A10 | −1.371E−01 | −3.095E+01 | −3.298E+01 | 2.279E+03 | −1.686E+04 |
| A12 | 4.756E−02 | 7.797E+01 | 1.129E+02 | −1.742E+04 | 2.386E+05 |
| A14 | −8.317E−03 | −1.082E+02 | −2.120E+02 | 8.201E+04 | −2.088E+06 |
| A16 | 9.077E−05 | 7.499E+01 | 1.998E+02 | −2.302E+05 | 1.099E+07 |
| A18 | 2.022E−04 | −1.615E+01 | −6.014E+01 | 3.492E+05 | −3.174E+07 |
| A20 | −2.276E−05 | −3.919E+00 | −1.797E+01 | −2.175E+05 | 3.850E+07 |

| Surface Number | S6 | S7 | S8 | S9 | S10 |
|---|---|---|---|---|---|
| K | 2.119E−01 | −3.119E+00 | 9.900E+01 | −4.203E+00 | −6.315E+00 |
| A4 | −3.288E−01 | −1.383E+00 | −1.479E+00 | −1.607E−01 | −1.509E−01 |
| A6 | 3.072E+00 | 1.284E+01 | 7.201E+00 | 2.353E−01 | 1.577E−01 |
| A8 | −1.928E+01 | −1.021E+02 | −2.878E+01 | −3.579E−01 | −1.317E−01 |
| A10 | 5.661E+01 | 5.568E+02 | 8.473E+01 | 4.205E−01 | 6.259E−02 |
| A12 | −9.732E+01 | −2.147E+03 | −1.761E+02 | −3.735E−01 | −5.833E−03 |
| A14 | 1.015E+02 | 5.580E+03 | 2.468E+02 | 2.343E−01 | −1.045E−02 |
| A16 | −5.035E+01 | −9.221E+03 | −2.201E+02 | −9.672E−02 | 5.625E−03 |
| A18 | 0.000E+00 | 8.723E+03 | 1.124E+02 | 2.295E−02 | −1.189E−03 |
| A20 | 0.000E+00 | −3.579E+03 | −2.496E+01 | −2.312E−03 | 9.498E−05 |

According to the information of parameters described above, the following data can be derived.

| | | | |
|---|---|---|---|
| R12/f | 0.591 | Y11/Y52 | 1.006 |
| f12/f45 | −0.436 | BFL/f | 0.718 |
| f2/f3 | 1.969 | FOV/ImgH (deg/mm) | 56.472 |
| ΣT/ΣCT | 0.358 | DIST (%) | 3.000 |
| ET1/CT1 | 1.940 | n2 + n4 | 3.322 |

In addition, it can be seen from the aberration diagram in FIG. 8 that the longitudinal spherical aberration, astigmatism, and distortion of the optical system 100 are well controlled, such that the optical system 100 of this embodiment has good imaging quality.

Fifth Embodiment

Figure 9:
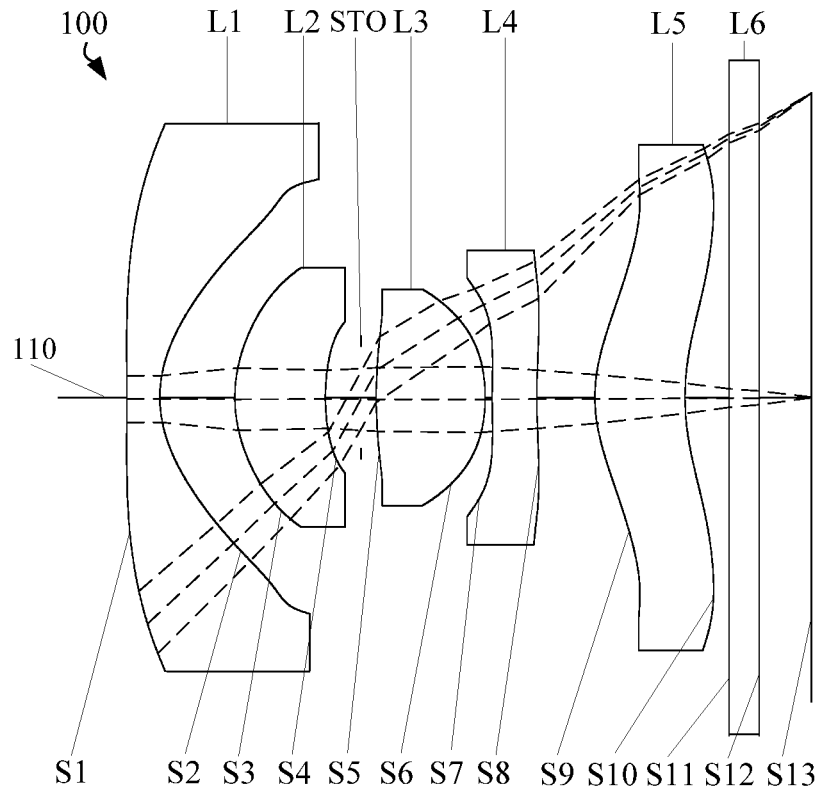
FIG. 9 is a schematic view of an optical system according to a fifth embodiment of the present disclosure.
Figure 10:
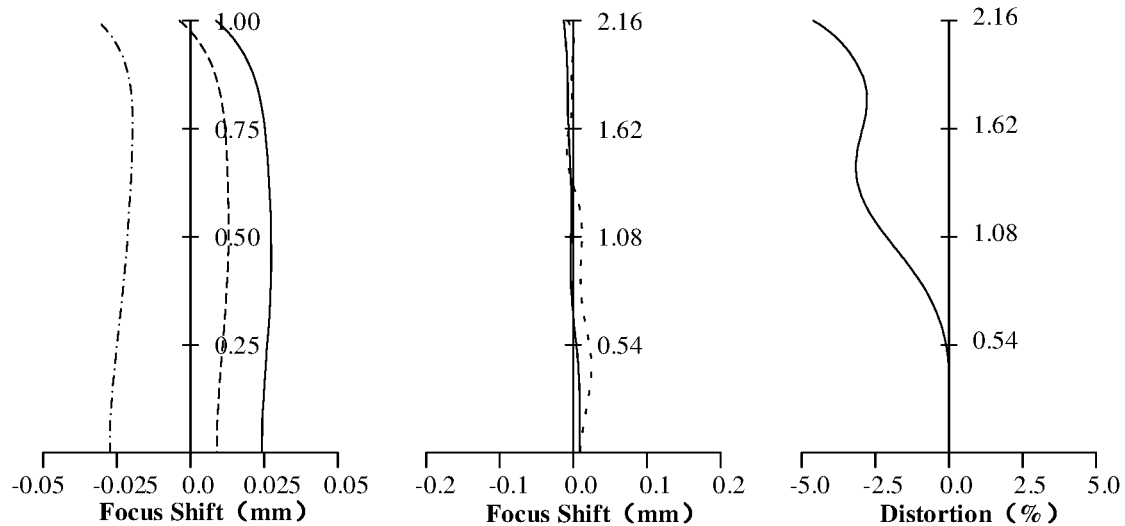
FIG. 10 is a graph showing longitudinal spherical aberration, astigmatism, and distortion of the optical system of FIG. 9.

FIG. 9 is a schematic view of an optical system 100 according to a fifth embodiment. The optical system 100 includes, successively in order from an object side to an image side, a first lens L1 having a negative refractive power, a second lens L2 having a positive refractive power, a stop STO, a third lens L3 having a positive refractive power, a fourth lens L4 having a negative refractive power, and a fifth lens L5 having a positive refractive power. FIG. 10 is a graph showing longitudinal spherical aberration, astigmatism, and distortion of the optical system 100 according to the fifth embodiment in order from left to right.

An object side surface S1 of the first lens L1 is concave near an optical axis 110 and convex at a circumference thereof.

An image side surface S2 of the first lens L1 is concave near the optical axis 110 and concave at the circumference thereof.

An object side surface S3 of the second lens L2 is convex near the optical axis 110 and convex at a circumference thereof.

An image side surface S4 of the second lens L2 is concave near the optical axis 110 and concave at the circumference thereof.

An object side surface S5 of the third lens L3 is convex near the optical axis 110 and convex at a circumference thereof.

An image side surface S6 of the third lens L3 is convex near the optical axis 110 and convex at the circumference thereof.

An object side surface S7 of the fourth lens L4 is convex near the optical axis 110 and concave at a circumference thereof.

An image side surface S8 of the fourth lens L4 is concave near the optical axis 110 and convex at the circumference thereof.

An object side surface S9 of the fifth lens L5 is convex near the optical axis 110 and concave at a circumference thereof.

An image side surface S10 of the fifth lens L5 is concave near the optical axis 110 and convex at the circumference thereof.

The object side surfaces and the image side surfaces of the first lens L1, the second lens L2, the third lens L3, the fourth lens L4, and the fifth lens L5 are all aspherical.

The first lens L1, the second lens L2, the third lens L3, the fourth lens L4, and the fifth lens L5 are all made of plastic.

In addition, various parameters of the optical system 100 are shown in Table 9, and the definition of each of the parameters can be obtained from the first embodiment, which will not be repeated herein.

TABLE 9

Fifth Embodiment
f = 1.279 mm, FNO = 2.35, FOV = 121.17 deg, TTL = 4.54 mm

| Surface Number | Surface Name | Surface Shape | Y radius (mm) | Thickness (mm) | Material | Refractive index | Abbe number | Focal Length (mm) |
|---|---|---|---|---|---|---|---|---|
| | Object Surface | Spherical | Infinite | Infinite | | | | |
| S1 | First Lens | Aspherical | −26.264 | 0.230 | Plastic | 1.535 | 55.790 | −1.617 |
| S2 | | Aspherical | 0.897 | 0.523 | | | | |
| S3 | Second Lens | Aspherical | 1.044 | 0.632 | Plastic | 1.660 | 20.100 | 3.039 |
| S4 | | Aspherical | 1.653 | 0.248 | | | | |
| | Stop | Spherical | Infinite | 0.106 | | | | |
| S5 | Third Lens | Aspherical | 3.451 | 0.760 | Plastic | 1.535 | 55.790 | 1.763 |
| S6 | | Aspherical | −1.198 | 0.050 | | | | |
| S7 | Fourth Lens | Aspherical | 10.819 | 0.311 | Plastic | 1.660 | 20.400 | −15.600 |
| S8 | | Aspherical | 5.215 | 0.404 | | | | |
| S9 | Fifth Lens | Aspherical | 1.098 | 0.629 | Plastic | 1.535 | 55.790 | 4.145 |
| S10 | | Aspherical | 1.742 | 0.308 | | | | |
| S11 | Infrared Filter | Spherical | Infinite | 0.210 | Glass | 1.517 | 64.167 | |
| S12 | | Spherical | Infinite | 0.362 | | | | |
| S13 | Image Surface | Spherical | Infinite | 0.000 | | | | |

Further, the aspheric coefficients of the image side surface or the object side surface of the lenses of the optical system 100 are shown in Table 10, and the definition of each of the parameters can be obtained from the first embodiment, and will not be repeated herein.

In addition, it can be seen from the aberration diagram in FIG. 10 that the longitudinal spherical aberration, astigmatism, and distortion of the optical system 100 are well controlled, such that the optical system 100 of this embodiment has good imaging quality.

TABLE 10

Fifth Embodiment
Aspheric Coefficient

| Surface Number | S1 | S2 | S3 | S4 | S5 |
|---|---|---|---|---|---|
| K | 9.888E+01 | −1.723E+00 | −3.549E−01 | 2.183E+00 | 8.781E+00 |
| A4 | 7.835E−02 | 4.757E−02 | −1.151E−01 | 2.572E−01 | −4.442E−02 |
| A6 | −6.319E−02 | −9.301E−02 | 9.276E−02 | −6.786E−01 | −2.590E−01 |
| A8 | 4.828E−02 | 1.407E−01 | −4.479E−01 | 1.580E+01 | 2.453E−01 |
| A10 | −2.705E−02 | −2.928E−01 | 1.695E+00 | −1.050E+02 | 1.488E−01 |
| A12 | 1.063E−02 | 5.141E−01 | −2.505E+00 | 4.379E+02 | −1.136E+00 |
| A14 | −2.840E−03 | −5.014E−01 | 1.857E+00 | −9.969E+02 | 1.226E+00 |
| A16 | 4.896E−04 | 2.639E−01 | −5.758E−01 | 1.011E+03 | 0.000E+00 |
| A18 | −4.895E−05 | −7.215E−02 | 0.000E+00 | 0.000E+00 | 0.000E+00 |
| A20 | 2.147E−06 | 8.145E−03 | 0.000E+00 | 0.000E+00 | 0.000E+00 |

| Surface Number | S6 | S7 | S8 | S9 | S10 |
|---|---|---|---|---|---|
| K | 6.413E−01 | 9.900E+01 | −9.900E+01 | −4.615E+00 | −3.521E+00 |
| A4 | −4.689E−01 | −3.661E−01 | −6.708E−02 | −2.834E−02 | −4.979E−02 |
| A6 | −2.939E−01 | −5.885E−01 | −2.094E−01 | −9.813E−02 | −9.394E−02 |
| A8 | 2.974E+00 | 1.766E+00 | 5.370E−01 | 1.648E−01 | 1.264E−01 |
| A10 | −7.331E+00 | −1.696E+00 | −7.231E−01 | −1.599E−01 | −8.681E−02 |
| A12 | 8.254E+00 | −3.195E+00 | 5.523E−01 | 1.148E−01 | 4.291E−02 |
| A14 | −2.898E+00 | 8.292E+00 | −1.673E−01 | −6.130E−02 | −1.584E−02 |
| A16 | −8.463E−01 | −4.734E+00 | 0.000E+00 | 2.130E−02 | 3.855E−03 |
| A18 | 0.000E+00 | 0.000E+00 | 0.000E+00 | −4.088E−03 | −5.222E−04 |
| A20 | 0.000E+00 | 0.000E+00 | 0.000E+00 | 3.237E−04 | 2.915E−05 |

According to the information of parameters described above, the following data can be derived.

| | | | |
|---|---|---|---|
| R12/f | 0.701 | Y11/Y52 | 1.075 |
| f12/f45 | −0.631 | BFL/f | 0.688 |
| f2/f3 | 1.724 | FOV/ImgH (deg/mm) | 56.097 |
| ΣT/ΣCT | 0.520 | DIST (%) | 3.670 |
| ET1/CT1 | 2.887 | n2 + n4 | 3.320 |

Figure 11:
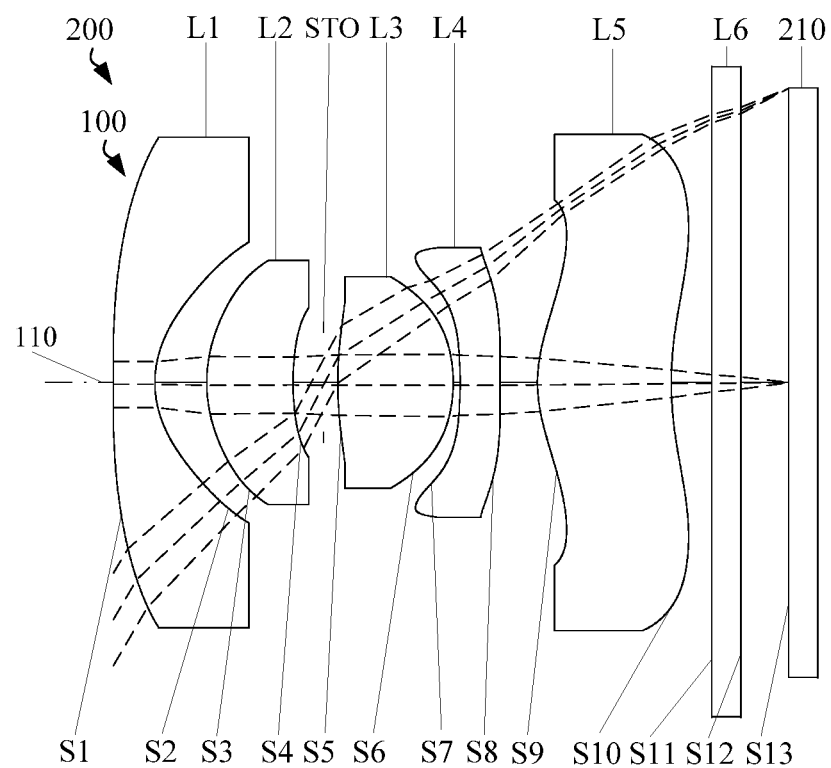
FIG. 11 a schematic view of an image acquisition module according to an embodiment of the present disclosure.

Referring to FIG. 11, in some embodiments, the optical system 100 and a photosensitive element 210 can be assembled to form an image acquisition module 200. In this case, a photosensitive surface of the photosensitive element 210 can be regard as the image surface S13 of the optical system 100. The image acquisition module 200 is provided with an infrared filter L6. The infrared filter L6 is arranged between the image side surface S10 of the fifth lens L5 and the image surface S13. Specifically, the photosensitive element 210 may be a Charge Coupled Device (CCD) or a Complementary Metal Oxide Semiconductor (CMOS) sensor. By applying the above optical system 100 in the image acquisition module 200, the image acquisition module 200 can have wide-angle characteristics and good imaging quality, and can form clear images while meeting the requirements of capturing in large range.

Figure 12:
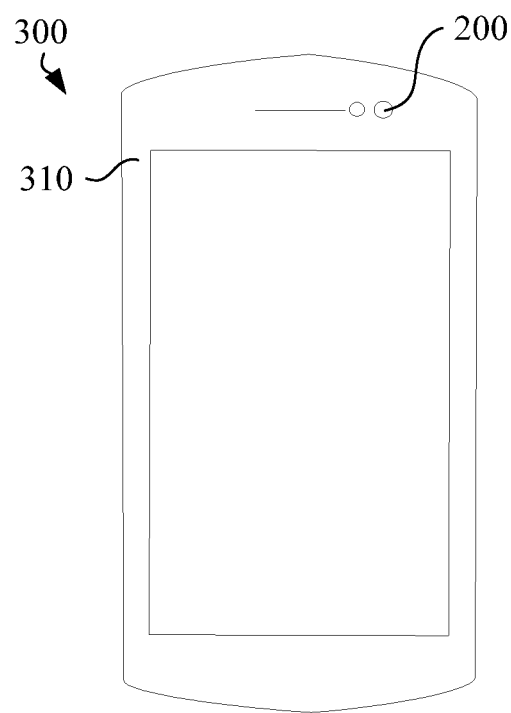
FIG. 12 is a schematic view of an electronic device according to an embodiment of the present disclosure.

Referring to FIGS. 11 and 12, in some embodiments, the image acquisition module 200 is applied in the electronic device 300. The electronic device includes a housing 310. The image acquisition module 200 is arranged in the housing 310.

Specifically, the electronic device 300 may be, but is not limited to, a portable phone, a video phone, a smart phone, an e-book reader, a driving recorder, or other in-vehicle camera device or a wearable device such as a smart watch. When the electronic device 300 is a smart phone, the housing 310 may be a middle frame of the electronic device 300. The image acquisition module 200 is applied in the electronic device 300, such that the electronic device 300 can have wide-angle characteristics and good imaging quality, and can form clear images while meeting the requirements of capturing in large range.

The technical features of the above-described embodiments can be combined arbitrarily. To simplify the description, not all possible combinations of the technical features in the above embodiments are described. However, all of the combinations of these technical features should be considered as being fallen within the scope of the present disclosure, as long as such combinations do not contradict with each other.

The foregoing embodiments merely illustrate some embodiments of the present disclosure, and descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements falls in the protection scope of the present disclosure. Therefore, the protection scope of the present disclosure shall be subject to the appended claims.

What is claimed is:

1. An optical system, comprising, successively in order from an object side to an image side along an optical axis:
    a first lens having a negative refractive power, an image side surface of the first lens being concave near the optical axis;
    a second lens having a positive refractive power, an object side surface of the second lens being convex near the optical axis, an image side surface of the second lens being concave near the optical axis;
    a third lens having a positive refractive power, an object side surface of the third lens being convex near the optical axis, an image side surface of the third lens being convex near the optical axis;
    a fourth lens having a negative refractive power;
    a fifth lens having a positive refractive power, an object side surface of the fifth lens being convex near the optical axis, an image side surface of the fifth lens being concave near the optical axis;
    wherein the optical system satisfies the following conditions:

$0.58 \leq R12/f \leq 0.71$;

wherein R12 is a radius of curvature of the image side surface of the first lens at the optical axis, and f is an effective focal length of the optical system; and $0.3 \leq \Sigma T/\Sigma CT \leq 0.55$;

wherein $\Sigma T$ is a sum of intervals between two adjacent lenses among the first lens, the second lens, the third lens, the fourth lens, and the fifth lens on the optical axis, $\Sigma CT$ is a sum of thicknesses of the first lens, the second lens, the third lens, the fourth lens, and the fifth lens on the optical axis.

2. The optical system according to claim 1, further satisfying the following condition:
    $-0.7 \leq f12/f45 < 0$;
    wherein f12 is a combined focal length of the first lens and the second lens, and f45 is a combined focal length of the fourth lens and the fifth lens.

3. The optical system according to claim 1, further satisfying the following condition:
    $1.6 \leq f2/f3 \leq 2.1$;
    wherein f2 is an effective focal length of the second lens, and f3 is an effective focal length of the third lens.

4. The optical system according to claim 1, further satisfying the following condition:
    $1.8 \leq ET1/CT1 \leq 2.9$;
    wherein ET1 is a distance from a portion of an object side surface having the maximum effective aperture to a portion of the image side surface having the maximum effective aperture of the first lens in a direction of the optical axis, CT1 is a thickness of the first lens on the optical axis.

5. The optical system according to claim 1, further satisfying the following condition:
    $0.9 \leq Y11/Y52 \leq 1.1$;
    wherein Y11 is the maximum effective aperture of an object side surface of the first lens, and Y52 is the maximum effective aperture of the image side surface of the fifth lens.

6. The optical system according to claim 1, further satisfying the following condition:
    $0.6 \leq BFL/f \leq 0.8$;
    wherein BFL is a distance from an image side surface of the fifth lens to an imaging surface of the optical system on the optical axis.

7. The optical system according to claim 1, further satisfying the following condition:
    $55 deg/mm \leq FOV/ImgH \leq 57 deg/mm$;
    wherein FOV is the maximum angle of field of view of the optical system, and ImgH is half of an image height of the optical system corresponding to the maximum angle of field of view.

8. The optical system according to claim 1, further satisfying the following condition:
    $|DIST| \leq 5\%$;
    wherein DIST is the maximum of optical distortion of the optical system.

9. The optical system according to claim 1, further satisfying the following condition:
    $n2+n4 \geq 3.32$;
    wherein n2 is a refractive index of the second lens at a wavelength of 587.5618 nm, and n4 is a refractive index of the fourth lens at a wavelength of 587.5618 nm.

10. An image acquisition module, comprising a photosensitive element and the optical system according to claim 1, wherein the photosensitive element is arranged on the image side of the optical system.

11. An electronic device, comprising a housing and the image acquisition module according to claim 10, wherein the image acquisition module is located in the housing.

12. An optical system, comprising, successively in order from an object side to an image side along an optical axis:
- a first lens having a negative refractive power, an image side surface of the first lens being concave near the optical axis;
- a second lens having a positive refractive power, an object side surface of the second lens being convex near the optical axis, an image side surface of the second lens being concave near the optical axis;
- a third lens having a positive refractive power, an object side surface of the third lens being convex near the optical axis, an image side surface of the third lens being convex near the optical axis;
- a fourth lens having a negative refractive power;
- a fifth lens having a positive refractive power, an object side surface of the fifth lens being convex near the optical axis, an image side surface of the fifth lens being concave near the optical axis;
- wherein the optical system satisfies the following conditions:

$$0.58 \leq R12/f \leq 0.71;$$

wherein R12 is a radius of curvature of the image side surface of the first lens at the optical axis, and f is an effective focal length of the optical system;

$$1.8 \leq ET1/CT1 \leq 2.9;$$

wherein ET1 is a distance from a portion of an object side surface having the maximum effective aperture to a portion of the image side surface having the maximum effective aperture of the first lens in a direction of the optical axis, CT1 is a thickness of the first lens on the optical axis.

13. An optical system, comprising, successively in order from an object side to an image side along an optical axis:
- a first lens having a negative refractive power, an image side surface of the first lens being concave near the optical axis;
- a second lens having a positive refractive power, an object side surface of the second lens being convex near the optical axis, an image side surface of the second lens being concave near the optical axis;
- a third lens having a positive refractive power, an object side surface of the third lens being convex near the optical axis, an image side surface of the third lens being convex near the optical axis;
- a fourth lens having a negative refractive power;
- a fifth lens having a positive refractive power, an object side surface of the fifth lens being convex near the optical axis, an image side surface of the fifth lens being concave near the optical axis;
- wherein the optical system satisfies the following conditions:

$$0.58 \leq R12/f \leq 0.71;$$

wherein R12 is a radius of curvature of the image side surface of the first lens at the optical axis, and f is an effective focal length of the optical system;

$$55 \deg/mm \leq FOV/ImgH \leq 57 \deg/mm;$$

wherein FOV is the maximum angle of field of view of the optical system, and ImgH is half of an image height of the optical system corresponding to the maximum angle of field of view.

* * * * *